United States Patent
Iriondo

(10) Patent No.: US 11,781,611 B2
(45) Date of Patent: Oct. 10, 2023

(54) DAMPER WITH COMPRESSION DAMPING FORCE RANGE INCREASE

(71) Applicant: DRiV Automotive Inc., Southfield, MI (US)

(72) Inventor: Jon Iriondo, Zaldibar (ES)

(73) Assignee: DRiV Automotive Inc., Northville, MI (US)

( * ) Notice: Subject to any disclaimer, the term of this patent is extended or adjusted under 35 U.S.C. 154(b) by 151 days.

(21) Appl. No.: 17/533,994

(22) Filed: Nov. 23, 2021

(65) Prior Publication Data
US 2023/0160452 A1 May 25, 2023

(51) Int. Cl.
*F16F 9/516* (2006.01)
*F16F 9/18* (2006.01)
(Continued)

(52) U.S. Cl.
CPC .............. *F16F 9/516* (2013.01); *B60G 13/08* (2013.01); *F16F 9/18* (2013.01); *F16F 9/348* (2013.01);
(Continued)

(58) Field of Classification Search
CPC .... F16F 9/516; F16F 9/18; F16F 9/348; F16F 9/369; F16F 2228/066; B60G 13/08;
(Continued)

(56) References Cited

U.S. PATENT DOCUMENTS 4,070,895 A * 1/1978 Yamada ..................... F16F 9/34
72/336

5,130,926 A * 7/1992 Watanabe ............ B60G 17/015
701/37
(Continued)

FOREIGN PATENT DOCUMENTS

DE 29518973 U1 2/1996
DE 19822648 A1 12/1998
(Continued)

OTHER PUBLICATIONS

"International Search Report and Written Opinion issued in corresponding PCT Application No. PCT/US2022/049773", dated Apr. 5, 2023.

*Primary Examiner* — Robert A. Siconolfi
*Assistant Examiner* — James K Hsiao
(74) *Attorney, Agent, or Firm* — Harness, Dickey & Pierce, P.L.C.

(57) ABSTRACT

A damper including inner and outer tubes and a control valve. A piston is slidably disposed within the inner tube to define first and second working chambers. An intermediate member assembly is disposed annularly about the inner tube. An intermediate channel is positioned radially between the intermediate member assembly and the inner tube and a reservoir channel is positioned radially between the intermediate member assembly and the outer tube. A first unidirectional blocking valve forms a first partition between first and second intermediate channel portions of the intermediate channel. A second unidirectional blocking valve forms a second partition between the second intermediate channel portion and a third intermediate channel portion. An external control valve has a control valve inlet that is arranged in fluid communication with the second intermediate channel portion.

20 Claims, 21 Drawing Sheets

(51) Int. Cl.
| | | |
|---|---|---|
| *F16F 9/34* | (2006.01) | |
| *B60G 13/08* | (2006.01) | |
| *B60G 17/015* | (2006.01) | |
| *F16F 9/348* | (2006.01) | |
| *F16F 9/36* | (2006.01) | |
| *G05D 7/01* | (2006.01) | |

(52) U.S. Cl.
CPC ............. *F16F 9/369* (2013.01); *G05D 7/012* (2013.01); *B60G 17/015* (2013.01); *B60G 2202/24* (2013.01); *B60G 2204/62* (2013.01); *B60G 2206/41* (2013.01); *B60G 2500/104* (2013.01); *B60G 2800/162* (2013.01); *F16F 2228/066* (2013.01)

(58) Field of Classification Search
CPC ............. B60G 17/015; B60G 2202/24; B60G 2204/62; B60G 2206/41; B60G 2500/104; B60G 2800/162; G05D 7/012
See application file for complete search history.

(56) References Cited

U.S. PATENT DOCUMENTS

| | | | | |
|---|---|---|---|---|
| 5,143,185 | A * | 9/1992 | Klein | F16F 9/465 |
| | | | | 188/266.8 |
| 6,648,308 | B2 * | 11/2003 | Gunnar Rothoff | B60G 17/044 |
| | | | | 280/6.159 |
| 6,978,871 | B2 | 12/2005 | Holiviers | |
| 7,347,307 | B2 * | 3/2008 | Joly | F16F 9/466 |
| | | | | 188/266.5 |
| 8,794,406 | B2 * | 8/2014 | de Kock | F16F 9/062 |
| | | | | 188/315 |
| 9,234,558 | B2 | 1/2016 | Yamasaki et al. | |
| 9,388,877 | B2 | 7/2016 | Konakai et al. | |
| 10,030,735 | B2 | 7/2018 | Nakano et al. | |
| 10,668,975 | B2 * | 6/2020 | Walthert | F16F 9/516 |
| 11,118,649 | B2 * | 9/2021 | Deferme | F16F 9/464 |
| 2005/0056504 | A1 * | 3/2005 | Holiviers | F16F 9/325 |
| | | | | 188/322.2 |
| 2007/0000743 | A1 * | 1/2007 | Naitou | B60G 15/12 |
| | | | | 188/322.2 |
| 2012/0001399 | A1 * | 1/2012 | Coombs | F16F 9/064 |
| | | | | 280/124.161 |
| 2012/0152671 | A1 * | 6/2012 | Murakami | F16F 9/187 |
| | | | | 188/315 |
| 2012/0247890 | A1 * | 10/2012 | Murakami | F16F 9/062 |
| | | | | 188/282.1 |
| 2013/0081912 | A1 * | 4/2013 | Murakami | F16F 9/06 |
| | | | | 188/282.1 |
| 2013/0264158 | A1 * | 10/2013 | Hall | F16F 9/187 |
| | | | | 188/313 |
| 2015/0152935 | A1 * | 6/2015 | Ogawa | F16F 9/46 |
| | | | | 188/313 |
| 2016/0236532 | A1 * | 8/2016 | Moulik | B60G 15/12 |
| 2017/0276205 | A1 * | 9/2017 | Ogawa | F16F 9/32 |
| 2018/0355940 | A1 * | 12/2018 | Manger | F16F 9/369 |
| 2020/0208704 | A1 * | 7/2020 | Deferme | F16F 9/185 |
| 2020/0208705 | A1 * | 7/2020 | Deferme | F16F 9/366 |
| 2022/0316547 | A1 * | 10/2022 | Iida | F16F 9/465 |

FOREIGN PATENT DOCUMENTS

| | | |
|---|---|---|
| DE | 102010045076 B3 | 1/2012 |
| JP | 2012002336 A | 1/2012 |

\* cited by examiner

DAMPER WITH COMPRESSION DAMPING FORCE RANGE INCREASE

FIELD

The present disclosure generally relates to dampers. More particularly, the present disclosure relates to dampers with a single externally mounted control valve.

BACKGROUND

This section provides background information related to the present disclosure which is not necessarily prior art.

Vehicles generally include dampers that are used in conjunction with suspension systems to absorb vibrations and bumps during driving. In order to absorb vibration and bumps, dampers are generally connected between a body and the suspension system of the vehicle. A piston is located within the damper and separates a first working chamber and a second working chamber. The piston is connected to the vehicle body or the suspension of the vehicle through a piston rod. Dampers typically include one or more valves that control fluid flow between the first and second working chambers during extension and compression motions of the piston and piston rod. In current damper designs, fluid flow during compression strokes is limited by the piston rod volume entering the damper. As a result, the range of damping forces the damper can provide is more limited during compression strokes compared to extension (e.g., rebound) strokes because the volume of fluid inside the damper that is displaced by the piston increases during compression strokes and decreases during rebound strokes.

SUMMARY

This section provides a general summary of the disclosure, and is not a comprehensive disclosure of its full scope or all of its features.

In accordance with one aspect of the present disclosure, a damper is provided. The damper includes an inner tube that extends longitudinally between first and second inner tube ends. The damper includes a piston slidably disposed within the inner tube. The piston defines a first working chamber and a second working chamber within the inner tube. The first working chamber is longitudinally positioned between the piston and the first inner tube end and the second working chamber is longitudinally positioned between the piston and the second inner tube end. The damper also includes an outer tube disposed annularly around the inner tube. The outer tube extends longitudinally between a first outer tube end and a second outer tube end. An intermediate member assembly is disposed annularly about the inner tube and is positioned radially between the inner tube and the outer tube. A reservoir chamber is disposed radially between the intermediate member assembly and the outer tube. Additionally, an intermediate channel is disposed radially between the intermediate member assembly and the inner tube. The intermediate channel has a first intermediate channel portion and a second intermediate channel portion.

The damper includes an external control valve mounted on the outer tube. The external control valve includes a control valve inlet and a control valve outlet. The control valve inlet is positioned in fluid communication with the second intermediate channel portion and the control valve outlet is positioned in fluid communication with the reservoir chamber.

The damper further includes a first unidirectional blocking valve disposed annularly about the inner tube, which forms a first partition between the first and second intermediate channel portions. The first unidirectional blocking valve is a one-way valve that permits fluid flow in only a first direction moving from the first intermediate channel portion to the second intermediate channel portion. The first unidirectional blocking valve moves/deflects to an open position when a first break pressure of the first unidirectional blocking valve is reached. The first unidirectional blocking valve includes a first annular sealing surface that extends circumferentially about the inner tube, which is configured to move into and out of contact with a first annular seat. Thus, when the first unidirectional blocking valve is in the open position, a first annular opening extends annularly within the intermediate channel and is defined between the first annular sealing surface and the first annual seat.

In accordance with another aspect of the present disclosure, the intermediate channel portion of the damper may further include a third intermediate channel portion. A second unidirectional blocking valve is disposed annularly about the inner tube, and forms a second partition between the second intermediate channel portion and the third intermediate channel portion. The second unidirectional blocking valve is a one-way valve that permits fluid flow in only a second direction moving from the third intermediate channel portion to the second intermediate channel portion. The second unidirectional blocking valve moves/deflects to an open position when a second break pressure of the second unidirectional blocking valve is reached. The second unidirectional blocking valve includes a second annular sealing surface that extends circumferentially about the inner tube, which is configured to move into and out of contact with a second annular seat. Thus, when the second unidirectional blocking valve is in the open position, a second annular opening extends annularly within the intermediate channel and is defined between the second annular sealing surface and the second annual seat.

In accordance with another aspect of the present disclosure, the damper may further include a base valve assembly including a base valve body, a first base valve, and a second base valve. The base valve body defines a fluid transport chamber positioned between the second outer tube end and the base valve body. Furthermore, the first intermediate channel portion is arranged in fluid communication with the first working chamber via one or more inner tube openings. The inner tube openings extend through the inner tube between the first working chamber and the first intermediate channel portion. More specifically, the intermediate channel extends longitudinally between a first intermediate channel end and a second intermediate channel end, and the intermediate channel openings are positioned at the second intermediate channel end. As such, the third intermediate channel portion is arranged in fluid communication with the second working chamber via intermediate channel openings.

Advantageously, the damper design disclosed, with its unidirectional blocking valves, allows for the first working chamber and second working chamber to work independently, increasing the range of compression damping forces that can be provided by a damper with one, externally mounted, electro-mechanical valve. The disclosed damper design can therefore be tuned within a larger compression damping force range to suit a wide spectrum of vehicles compared to other dampers designs.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
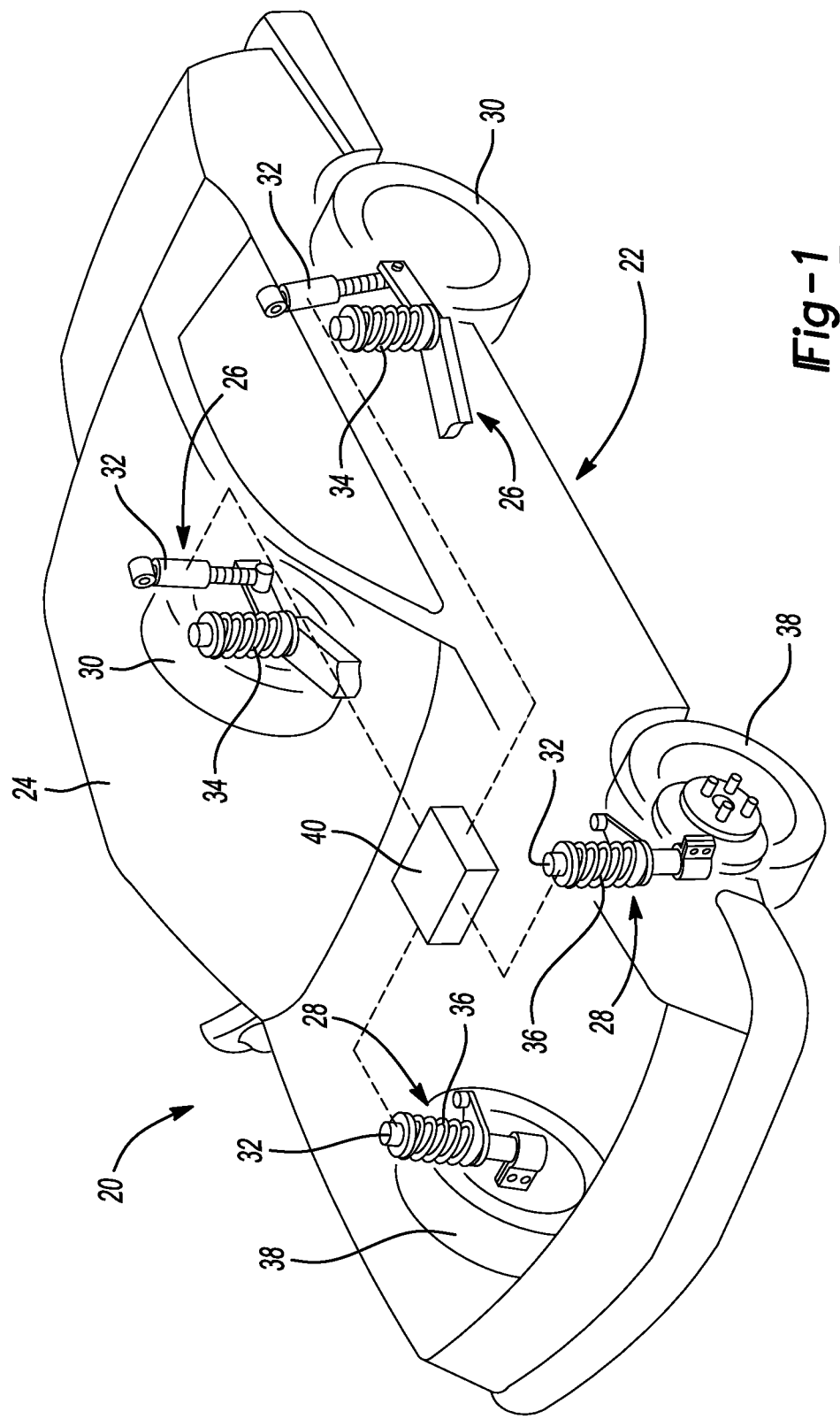
FIG. 1 is an illustration of a vehicle incorporating a suspension system constructed in accordance with the present disclosure.
Figure 2:
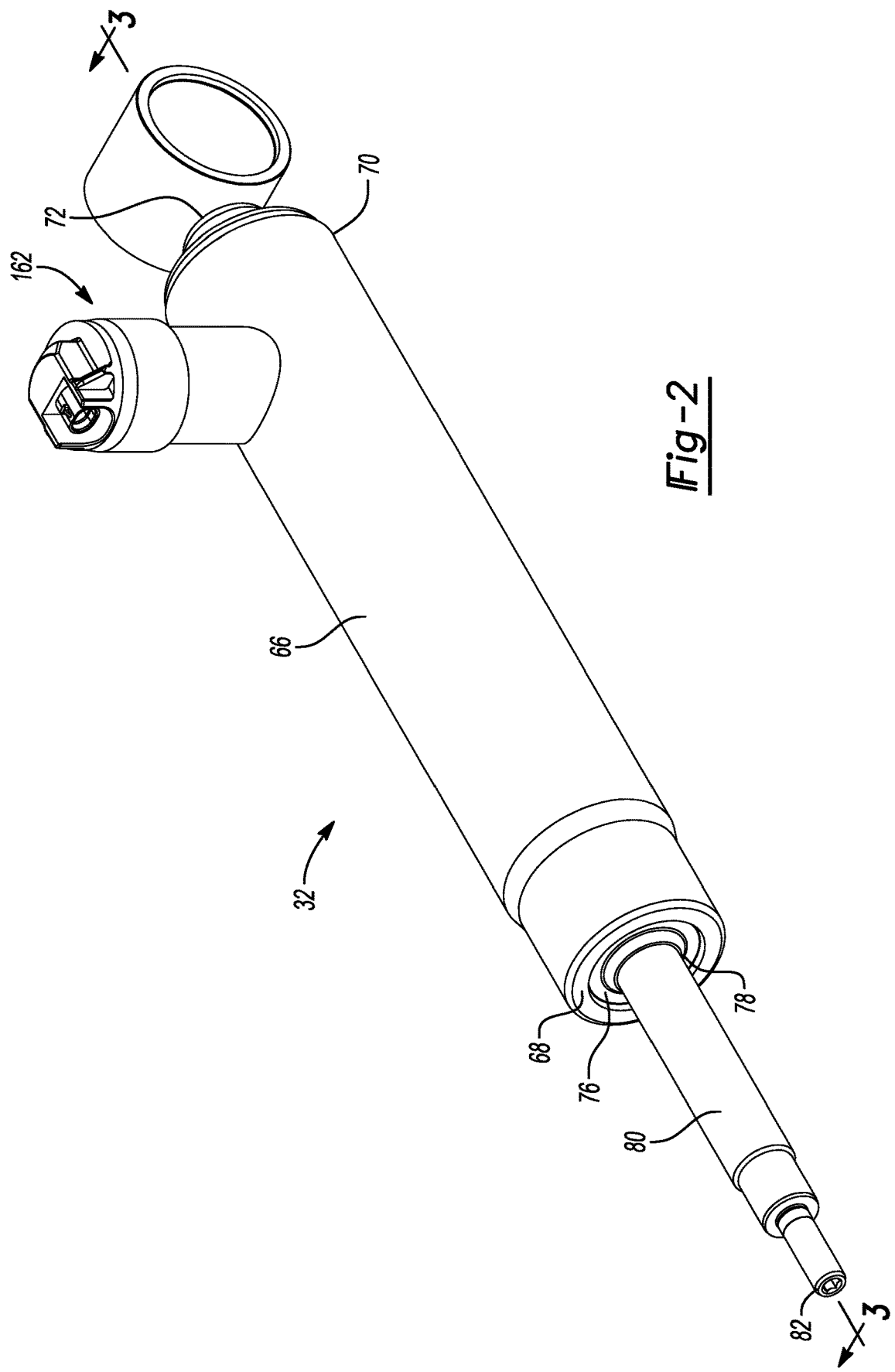
FIG. 2 is a front perspective view of an exemplary damper constructed in accordance with the present disclosure.
Figure 3:
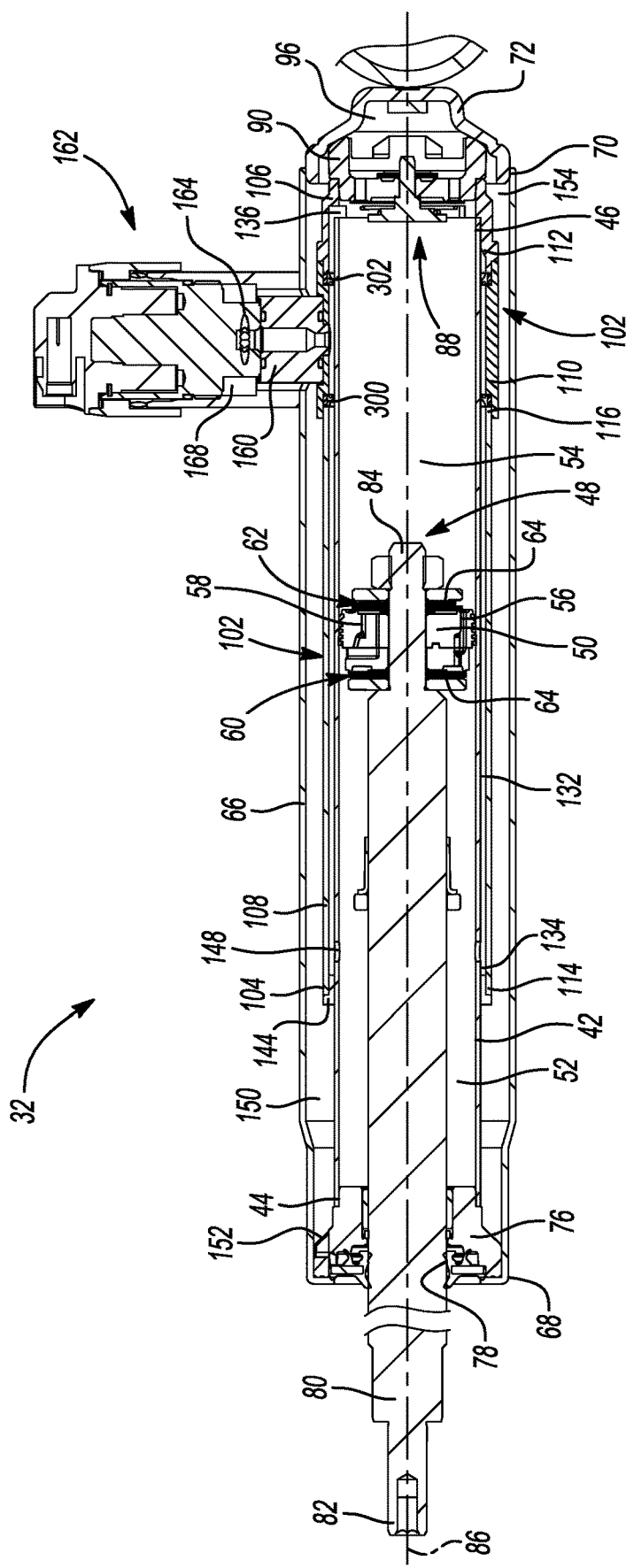
FIG. 3 is a side cross-sectional view of the exemplary damper shown in FIG. 2.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an exemplary vehicle 20 incorporating a suspension system 22 in accordance with the present disclosure. The vehicle 20 may be driven by an internal combustion engine, an electric motor, a hybrid/electric powertrain, or equivalents thereof. The vehicle 20 includes a body 24. The suspension system 22 of the vehicle 20 includes a rear suspension 26 and a front suspension 28. The rear suspension 26 includes a transversely extending rear axle assembly (not shown) adapted to operatively support a pair of rear wheels 30. The rear axle assembly is operatively connected to the body 24 by means of a pair of dampers 32 and a pair of helical coil springs 34. Similarly, the front suspension 28 includes a transversely extending front axle assembly (not shown) that supports a pair of front wheels 38. The front axle assembly is connected to the body 24 by means of another pair of the dampers 32 and a pair of helical coil springs 36. In an alternative embodiment, the vehicle 20 may include an independent suspension unit (not shown) for each of the four corners instead of front and rear axle assemblies.

The dampers 32 of the suspension system 22 serve to dampen the relative movement of the unsprung portion (i.e., the front and rear suspensions 28, 26 and the front and rear wheels 38, 30) and the sprung portion (i.e., the body 24) of the vehicle 20. While the vehicle 20 has been depicted as a passenger car, the dampers 32 may be used with other types of vehicles. Examples of such vehicles include buses, trucks, off-road vehicles, three-wheelers, ATVs, motor bikes, and so forth. Furthermore, the term "damper" as used herein will refer to dampers in general and will include shock absorbers, McPherson struts, and semi-active and active suspensions.

In order to automatically adjust each of the dampers 32, an electronic controller 40 is electrically connected to the dampers 32. The electronic controller 40 is used for controlling the operation of each of the dampers 32 in order to provide appropriate damping characteristics resulting from movements of the body 24 of the vehicle 20. The electronic controller 40 may independently control each of the dampers 32 in order to independently control a damping level of each of the dampers 32. The electronic controller 40 may be electrically connected to the dampers 32 via wired connections, wireless connections, or a combination thereof.

The electronic controller 40 may independently adjust the damping level, damping rate, or damping characteristics of each of the dampers 32 to optimize the ride performance of the vehicle 20. The term "damping level", as used herein, refers to a damping force produced by each of the dampers 32 to counteract compression and/or extension/rebound movements. A higher damping level may correspond to a higher damping force. Similarly, a lower damping level may correspond to a lower damping force. Adjustment of the damping levels is beneficial during braking and turning of the vehicle 20 to counteract brake dive during braking and body roll during turns. In accordance with one embodiment of the present disclosure, the electronic controller 40 processes input signals from one or more sensors (not shown) of the vehicle 20 in order to control the damping level of each of the dampers 32. The sensors may sense one or more parameters of the vehicle 20, such as, but not limited to, displacement, velocity, acceleration, vehicle speed, steering wheel angle, brake pressure, engine torque, engine speed in revolutions per minute (RPM), throttle pedal position, and so forth. The electronic controller 40 may further control the damping level of the dampers 32 based on a driving mode of the vehicle 20. The driving mode may include a sport mode and a comfort mode. A button (not shown) may allow a driver of the vehicle 20 to choose the driving mode of the vehicle 20. The electronic controller 40 may receive input signals based on an actuation of the button and control the dampers 32 accordingly.

In accordance with another embodiment of the present disclosure, the electronic controller 40 controls the damping level of each of the dampers 32 based on external road conditions, such as rain, snow, mud, and the like. In a further embodiment, the electronic controller 40 regulates the damping level of each of the dampers 32 based on internal vehicle conditions, such as a fuel level, occupancy of the vehicle, load, and so forth.

While the present disclosure is being illustrated with a single electronic controller 40, it is within the scope of the present disclosure to utilize a dedicated electronic controller for each of the dampers 32. The dedicated electronic controller may be located onboard each respective damper 32. Alternatively, the electronic controller 40 may be integrated into an Electronic Control Unit (ECU) of the vehicle 20. The electronic controller 40 may include a processor, memory, Input/Output (I/O) interfaces, communication interfaces, and other electrical components. The processor may execute various instructions stored in the memory for carrying out various operations of the electronic controller 40. The electronic controller 40 may receive and transmit signals and data through the I/O interfaces and the communication interfaces. In further embodiments, the electronic controller 40 may include microcontrollers, application-specific integrated circuits (ASICs), field programmable gate arrays (FPGAs), and so forth.

FIGS. 2 to 6 illustrate an exemplary damper 32, which may be any of the four dampers 32 of the vehicle 20 shown in FIG. 1. The damper 32 may optionally be configured as a continuously variable semi-active suspension system damper 32. The damper 32 contains fluid. By way of example and without limitation, the fluid is hydraulic fluid or oil. The damper 32 includes an inner tube 42 that extends longitudinally between a first inner tube end 44 and a second inner tube end 46. A piston assembly 48 includes a piston 50 slidably disposed within the inner tube 42. The piston 50 defines a first working chamber 52 and a second working chamber 54 within the inner tube 42. The first working chamber 52 is positioned longitudinally between the piston 50 and the first inner tube end 44 and acts as a rebound chamber during movement of the piston 50. The second working chamber 54 is positioned longitudinally between the piston 50 and the second inner tube end 46 and acts as a compression chamber. The piston 50 includes first and second piston passages 56, 58 that extend longitudinally through the piston 50 between the first and second working chambers 52, 54.

The piston assembly 48 further includes a first piston valve 60 and a second piston valve 62. The first piston valve 60 is mounted on the piston 50 and configured to limit fluid flow through the first piston passage 56 from the second working chamber 54 to the first working chamber 52. The second piston valve 62 is mounted on the piston 50 and configured to limit fluid flow through the second piston passage 58 from the first working chamber 52 to the second working chamber 54. Each of the first piston valve 60 and second piston valve 62 includes at least one flex disc 64. For the first piston valve 60, the flex disc 64 is configured to flex toward the piston 50 and close the first piston passage 56 when a first pressure differential between the first and second working chambers 52, 54 is below a first pressure threshold. The flex disc 64 is configured to flex away from the piston 50 and open the first piston passage 56 when the first pressure differential between the first and second working chambers 52, 54 exceeds the first pressure threshold, thereby allowing fluid in the second working chamber 54 to flow through the first piston passage 56 and into the first working chamber 52. For the second piston valve 62, the flex disc 64 is configured to flex toward the piston 50 and close the second piston passage 58 when a second pressure differential between the first and second working chambers 52, 54 is below a second pressure threshold. The flex disc 64 is configured to flex away from the piston 50 and open the second piston passage 58 when the second pressure differential between the first and second working chambers 52, 54 exceeds the second pressure threshold, thereby allowing fluid in the first working chamber 52 to flow through the second piston passage 58 and into the second working chamber 54.

The damper 32 also includes an outer tube 66 disposed annularly around the inner tube 42 and extends longitudinally between a first outer tube end 68 and a second outer tube end 70. A closed end portion 72 is positioned in and closes off the second outer tube end 70. A piston rod guide 76 is housed inside the first outer tube end 68. The piston rod guide 76 includes a piston rod passage 78 that extends longitudinally between the first outer tube end 68 and the first working chamber 52 of the inner tube 42. A piston rod 80 extends longitudinally between a first piston rod end 82 and a second piston rod end 84 along a longitudinal axis 86, through the piston rod passage 78 of the piston rod guide 76. The second piston rod end 84 is attached to the piston 50 and the first piston rod end 82 is configured to attach to a suspension component of the vehicle.

The damper 32 further includes a base valve assembly 88. The base valve assembly 88 includes a base valve body 90, a first base valve 92, and a second base valve 94. The base valve body 90 has projections 95 that abut the closed end portion 72 of the second outer tube end 70 and defines a fluid transport chamber 96 positioned between the closed end portion 72 and the base valve body 90. The base valve body 90 includes a first and second base valve passage 98, 100 that extends longitudinally through the base valve body 90 between the second working chamber 54 and the fluid transport chamber 96. The first base valve 92 includes at least one flex disc 64 that is configured to flex toward the base valve body 90 and close the first base valve passage 98 when a third pressure differential between the second working chamber 54 and the fluid transport chamber 96 is below a third pressure threshold. The flex disc 64 of the first base valve 92 is configured to flex away from the base valve body 90 and open the first base valve passage 98 when the third pressure differential between the second working chamber and the fluid transport chamber 96 exceeds the third pressure threshold, thereby allowing fluid in the fluid transport chamber 96 to flow through the first base valve passage 98 and into the second working chamber 54. The second base valve 94 also includes at least one flex disc 64 that is configured to flex toward the base valve body 90 and close the second base valve passage 100 when a fourth pressure differential between the second working chamber 54 and the fluid transport chamber 96 is below a fourth pressure threshold. The flex disc 64 of the second base valve 94 is configured to flex away from the base valve body 90 and open the second base valve passage 100 when the fourth pressure differential between the second working chamber 54 and the fluid transport chamber 96 exceeds the fourth pressure threshold, thereby allowing fluid in the second working chamber 54 to flow through the second base valve passage 100 and into the fluid transport chamber 96.

Further, the damper 32 includes an intermediate member assembly 102 disposed annularly about the inner tube 42 and positioned radially between the inner tube 42 and the outer tube 66. The intermediate member assembly 102 extends longitudinally between a first intermediate member assembly end 104 and a second intermediate member assembly end 106.

The intermediate member assembly 102 includes a third tube 108, a control valve coupling sleeve 110, and a base valve coupling sleeve 112. The third tube 108 extends longitudinally between a distal end 114 and a proximal end 116. Next, the control valve coupling sleeve 110 extends longitudinally between a first sleeve end 118 and a second sleeve end 120. The control valve coupling sleeve 110 includes a control valve opening 122. Finally, the base valve coupling sleeve 112 extends longitudinally between a first coupling end 124 and a second coupling end 126 that receives at least part of the base valve assembly 88.

The control valve coupling sleeve 110 has an interior surface 174 that includes a first shoulder 176 and a second shoulder 178. The proximal end 116 of the third tube 108 is received in the first sleeve end 118 of the control valve coupling sleeve 110 in a press-fit and the first coupling end 124 of the base valve coupling sleeve 112 is received in the second sleeve end 120 of the control valve coupling sleeve 110 in a press-fit. Furthermore, the base valve coupling sleeve 112 includes an interior sleeve surface 128 with a plurality of slots 130 that are circumferentially spaced.

The damper 32 also includes an intermediate channel 132 disposed radially between the intermediate member assembly 102 and the inner tube 42. The intermediate channel 132 extends longitudinally between a first intermediate channel end 134 and a second intermediate channel end 136, and has a first intermediate channel portion 138, a second intermediate channel portion 140, and a third intermediate channel portion 142. At the first intermediate channel end 134, a seal 144 is disposed and extends radially between the inner tube 42 and the first intermediate member assembly end 104. As such, the first intermediate member assembly end 104 abuts the seal 144 and the second intermediate member assembly end 106 abuts the base valve assembly 88. At the second intermediate channel end 136, at least one intermediate channel opening 146 is positioned that allows for fluid communication between the second working chamber 54 and the third intermediate channel portion 142.

The second intermediate channel portion 140 is positioned between the first intermediate channel portion 138 and the third intermediate channel portion 142. More specifically, the first intermediate channel portion 138 is defined between the third tube 108 and the inner tube 42, the second intermediate channel portion 140 is defined between the control valve coupling sleeve 110 and the inner tube 42, and the third intermediate channel portion 142 is defined between the base valve coupling sleeve 112 and the inner tube 42. Additionally, the first intermediate channel portion 138 is arranged in fluid communication with the first working chamber 52 via at least one inner tube opening 148 that extends through the inner tube 42 between the first working chamber 52 and the first intermediate channel portion 138.

The damper 32 includes a first unidirectional blocking valve 300 and a second unidirectional blocking valve 302. The first unidirectional blocking valve 300 is disposed annularly about the inner tube 42 and forms a first partition 304 (see FIG. 6) between the first intermediate channel portion 138 and the second intermediate channel portion 140. The first unidirectional blocking valve 300 is positioned adjacent to and is held between the proximal end 116 of the third tube 108 and the first shoulder 176 in the control valve coupling sleeve 110. The second unidirectional blocking valve 302 is disposed annularly about the inner tube 42 that forms a second partition 306 (see FIG. 5) between the second intermediate channel portion 140 and the third intermediate channel portion 142. The second unidirectional blocking valve 302 is positioned adjacent to and is held between the second shoulder 178 in the control valve coupling sleeve 110 and first coupling end 124 of the base valve coupling sleeve 112. The first and second unidirectional blocking valves 300, 302 are one-way valves that permit fluid flow in only one direction (i.e., the first and second unidirectional blocking valves 300, 302 only allow fluid flow into the second intermediate channel portion 140 from the first and third intermediate channel portions 138, 142).

The damper 32 further includes a reservoir chamber 150, disposed radially between the intermediate member assembly 102 and the outer tube 66, extending longitudinally between a first reservoir chamber end 152 and a second reservoir chamber end 154. The first reservoir chamber end 152 is positioned adjacent to the piston rod guide 76 and the second reservoir chamber end 154 is positioned adjacent to the closed end portion 72. The reservoir chamber 150 is filled with fluid and gas where gas rises toward the first reservoir chamber end 152 and fluid fills the reservoir chamber 150 from the second reservoir chamber end 154 toward the first reservoir chamber end 152. At least one reservoir chamber passage 156 is positioned between the projections 95 on the base valve body 90 that provides fluid communication between the reservoir chamber 150 and the fluid transport chamber 96.

The damper 32 includes an outer tube opening 158, positioned between the first outer tube end 68 and the second outer tube end 70, that extends through the outer tube 66. A control valve seat 160 is positioned within the outer tube opening 158, extends through the reservoir chamber 150, and abuts the intermediate member assembly 102. An external control valve 162 abuts the control valve seat 160 and is externally mounted to the outer tube 66. The external control valve 162 includes a control valve inlet 164 aligned and arranged in fluid communication with the second intermediate channel portion 140 via a control valve inlet passage 166. The control valve inlet passage 166 extends through the control valve seat 160. The external control valve 162 further includes a control valve outlet 168 positioned in fluid communication with the reservoir chamber 150 via a control valve outlet passage 170.

The external control valve 162 is a two-position, solenoid actuated electro-mechanical valve. The electronic controller 40 may regulate the external control valve 162 in order to control the damping level of the damper 32. The external control valve 162 may be controlled by an input current provided to the solenoid of the external control valve 162. The electronic controller 40 generates the input current in order to control the operation and the damping level of the damper 32. The solenoid of the external control valve 162 may be connected in electrical communication with the electronic controller 40. Further, the input current may vary between lower and upper limits, which correspond to least and most restrictive positions (i.e., an open position and a closed position) of the external control valve 162. The electronic controller 40 may control the damping force or level by controlling a degree of restriction of the external control valve 162. Specifically, the electronic controller 40 may regulate the input currents to vary a restriction of the external control valve 162. Sending a low current to the external control valve 162 may correspond to low damping ratio or damping level. Similarly, sending a high current to the external control valve 162 may correspond to a high damping ratio or damping level.

The first unidirectional blocking valve 300 permits fluid flow in a first direction 308 (see FIG. 5) moving from the first intermediate channel portion 138 to the second intermediate channel portion 140 when the first unidirectional blocking valve 300 is in an open position. The second unidirectional blocking valve 302 permits fluid flow in a second direction 310 (see FIG. 6) moving from the third intermediate channel portion 142 to the second intermediate channel portion 140 when the second unidirectional blocking valve 302 is an open position.

Figure 5:
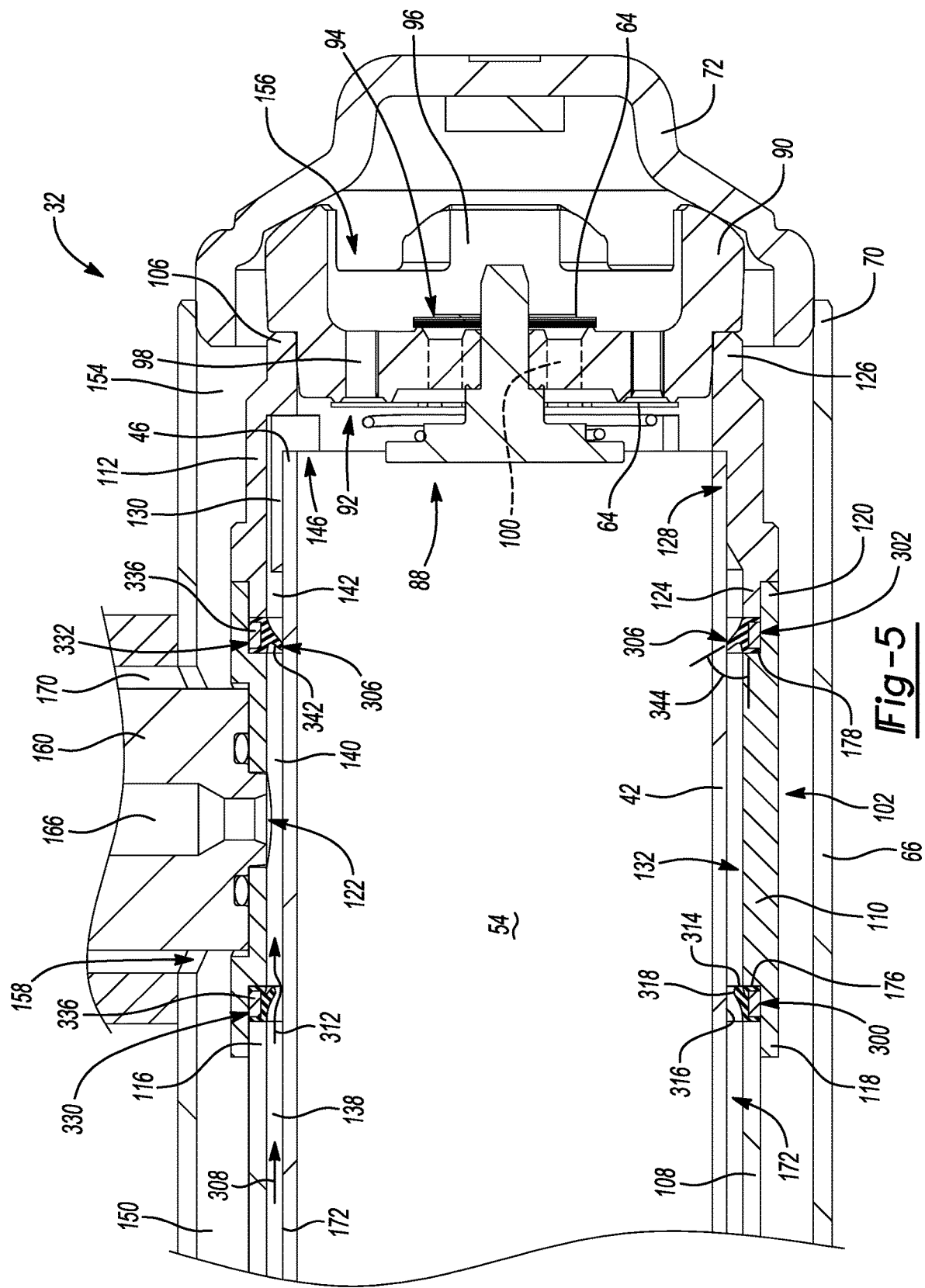
FIG. 5 is an enlarged side cross-sectional view of the exemplary damper shown in FIG. 3, where a first unidirectional blocking valve of the damper is illustrated in an open position and a second unidirectional blocking valve of the damper is illustrated in a closed position.

As shown in FIG. 5, the first unidirectional blocking valve 300 is configured to open a first fluid flow path 312 when a first fluid pressure differential between the first intermediate channel portion 138 and the second intermediate channel portion 140 exceeds a first break pressure of the first unidirectional blocking valve 300. The first fluid flow path 312 is configured to permit the fluid in the first intermediate channel portion 138 to flow in the first direction 308 into the second intermediate channel portion 140. Additionally, the first unidirectional blocking valve 300 is configured to close the first fluid flow path 312 when the first fluid pressure differential between the first intermediate channel portion 138 and the second intermediate channel portion 140 is less than the first break pressure of the first unidirectional blocking valve 300 (see FIG. 6).

The first unidirectional blocking valve 300 includes a first annular sealing surface 314 that extends circumferentially about the inner tube 42 and is configured to move into and out of contact with a first annular seat 316. When the first unidirectional blocking valve 300 is in the open position (FIG. 5), a first annular opening 318 extends annularly within the intermediate channel 132 and is defined between the first annular sealing surface 314 and the first annular seat 316. When the first unidirectional blocking valve 300 is in the closed position (FIG. 6), the first annular sealing surface 314 contacts the first annular seat 316.

Figure 6:
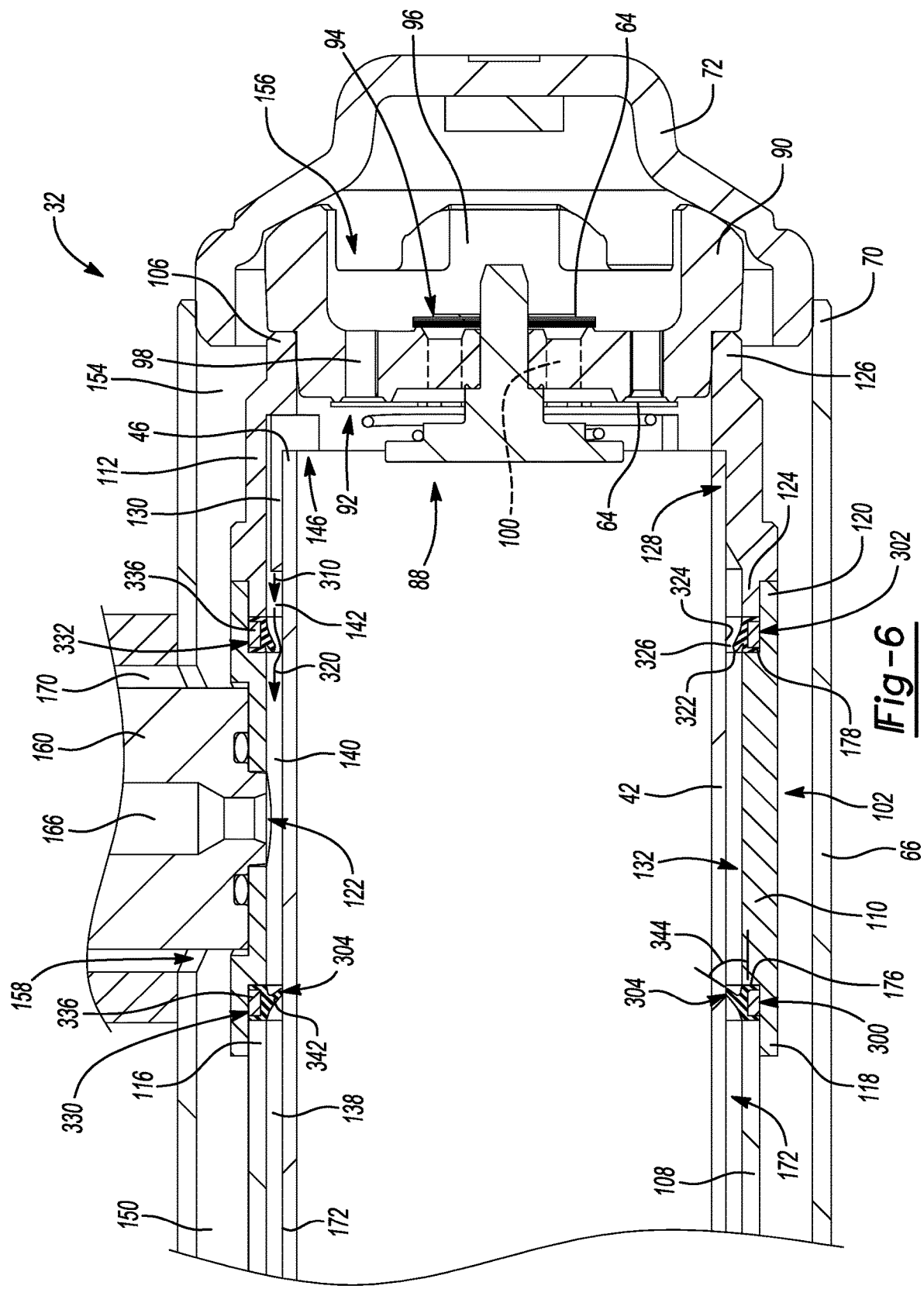
FIG. 6 is an enlarged side cross-sectional view of the exemplary damper shown in FIG. 3, where the first unidirectional blocking valve is illustrated in a closed position and the second unidirectional blocking valve is illustrated in an open position.

As shown in FIG. 6, the second unidirectional blocking valve 302 is configured to open a second fluid flow path 320 when a second fluid pressure differential between the third intermediate channel portion 142 and the second intermediate channel portion 140 exceeds a second break pressure of the second unidirectional blocking valve 302. The second fluid flow path 320 is configured to permit fluid in the third intermediate channel portion 142 to flow in the second direction 310 into the second intermediate channel portion 140. Additionally, the second unidirectional blocking valve 302 is configured to close the second fluid flow path 320 when the second fluid pressure differential between the third intermediate channel portion 142 and the second intermediate channel portion 140 is less than the second break pressure of the second unidirectional blocking valve 302 (see FIG. 5).

The second unidirectional blocking valve 302 includes a second annular sealing surface 322 that extends circumferentially about the inner tube 42 and that is configured to move into and out of contact with a second annular seat 324. When the second unidirectional blocking valve 302 is in the open position (FIG. 6), a second annular opening 326 extends annularly within the intermediate channel 132 between the second annular sealing surface 322 and the second annular seat 324. When the second unidirectional blocking valve 302 is in the closed position (FIG. 5), the second annular sealing surface 322 contacts the second annular seat 324.

As shown in FIGS. 4 to 18, the first unidirectional blocking valve 300 and the second unidirectional blocking valve 302 may be constructed in a number of different ways. However, many of the elements of the damper 32 previously described are the same or substantially the same amongst the multiple embodiments. Equivalent elements shared between the embodiments have the same or corresponding reference numbers. For example, reference numerals 300 and 302 in FIGS. 4 to 6 correspond to reference numerals 400 and 402 in FIGS. 7 to 9, reference numerals 500 and 502 in FIGS. 10 to 12, reference numerals 600 and 602 in FIGS. 13 to 15, and reference numerals 700 and 702 in FIGS. 16 to 18.

Figure 4:
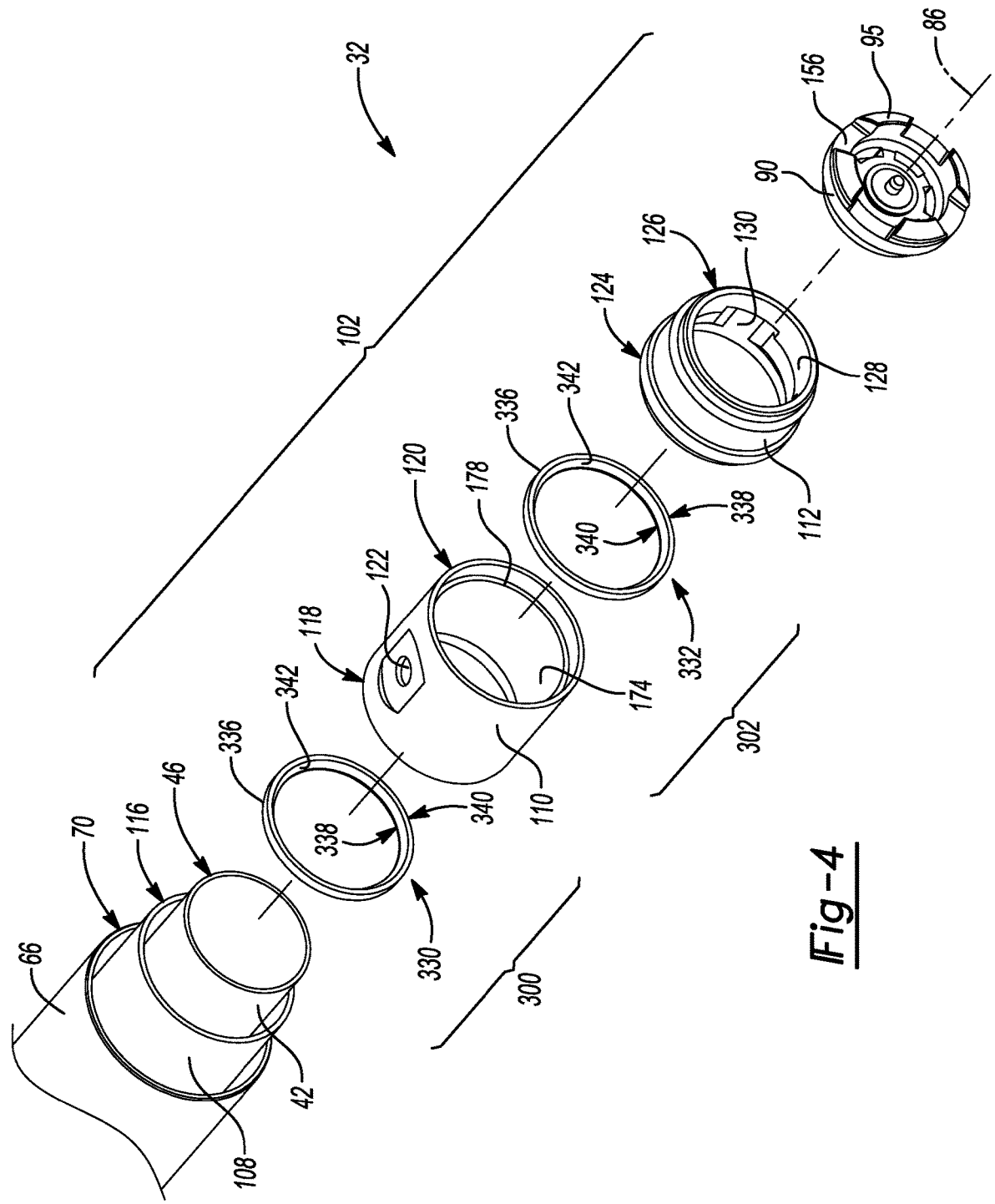
FIG. 4 is an enlarged exploded perspective view of the exemplary damper shown in FIG. 3.

In the embodiment shown in FIGS. 4 to 6, the first unidirectional blocking valve 300 includes a first oil seal 330 disposed annularly about the inner tube 42 and the second unidirectional blocking valve 302 includes a second oil seal 332 disposed annularly about the inner tube 42. The inner tube 42 has an outer surface 172 such that the first and second annular seats 316, 324 of the first and second unidirectional blocking valves 300, 302 are portions of the outer surface 172 of the inner tube 42. Each of the first oil seal 330 and the second oil seal 332 includes a cylindrical seal portion 336 that is arranged in abutting contact with the control valve coupling sleeve 110 and that extends longitudinally between a first seal end 338 and a second seal end 340. Furthermore, each of the first oil seal 330 and second oil seal 332 includes a funnel shaped portion 342 that extends radially inward at a first angle 344 from the cylindrical seal portion 336 to the first and second annular sealing surfaces 314, 322, respectively, such that the innermost lip of the funnel shaped portion 342 contacts the outer surface 172 of the inner tube 42 as the first and second annular sealing surfaces 314, 322.

The first and second oil seals 330, 332 may be made of a resilient material. The funnel shaped portion 342 of the first and second oil seals 330, 332 is flexible such that the first and second annular sealing surfaces 314, 322 of the funnel shaped portion 342 are configured to move into and out of contact with the first and second annular seats 316, 324 on the outer surface 172 of the inner tube 42. More specifically, the funnel shaped portion 342 of the first oil seal 330 is configured to flex away from the inner tube 42 and toward the cylindrical seal portion 336 to open the first fluid flow path 312 and the second oil seal 332 is also configured to flex away from the inner tube 42 and toward the cylindrical seal portion 336 to open the second fluid flow path 320. The first fluid flow path 312 between the funnel shaped portion 342 of the first oil seal 330 and the inner tube 42 opens when the first fluid pressure differential between the first intermediate channel portion 138 and the second intermediate channel portion 140 exceeds the first break pressure of the first unidirectional blocking valve 300. The second fluid flow path 320 between the funnel shaped portion 342 of the second oil seal 332 and the inner tube 42 opens when a second fluid pressure differential between the third intermediate channel portion 142 and the second intermediate channel portion 140 exceeds the second break pressure of the second unidirectional blocking valve 302.

Figure 7:
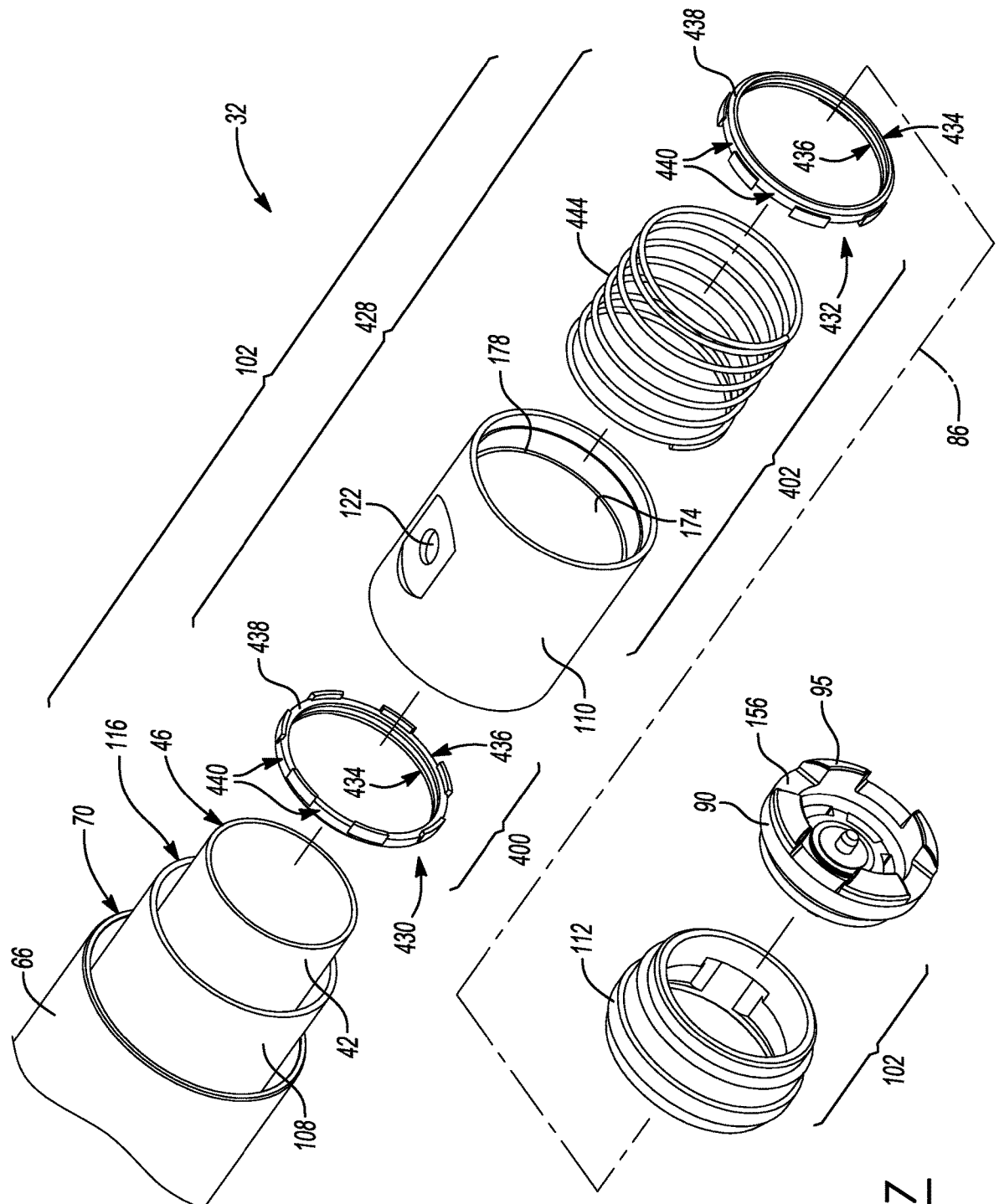
FIG. 7 is an enlarged exploded perspective view of another exemplary damper constructed in accordance with another aspect of the present disclosure.
Figure 8:
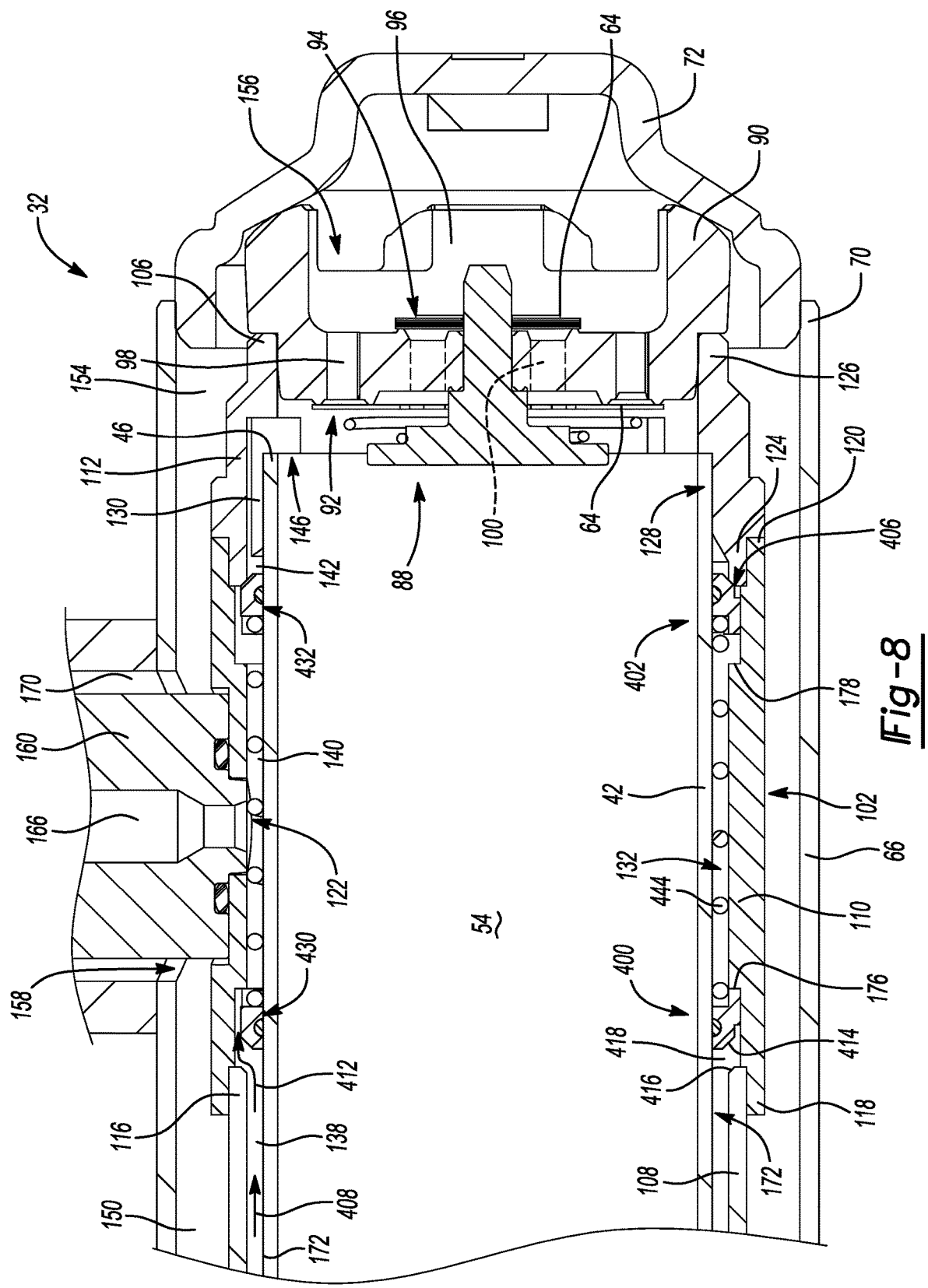
FIG. 8 is an enlarged side cross-sectional view of the exemplary damper shown in FIG. 7, where a first unidirectional blocking valve of the damper is illustrated in an open position and a second unidirectional blocking valve of the damper is illustrated in a closed position.
Figure 9:
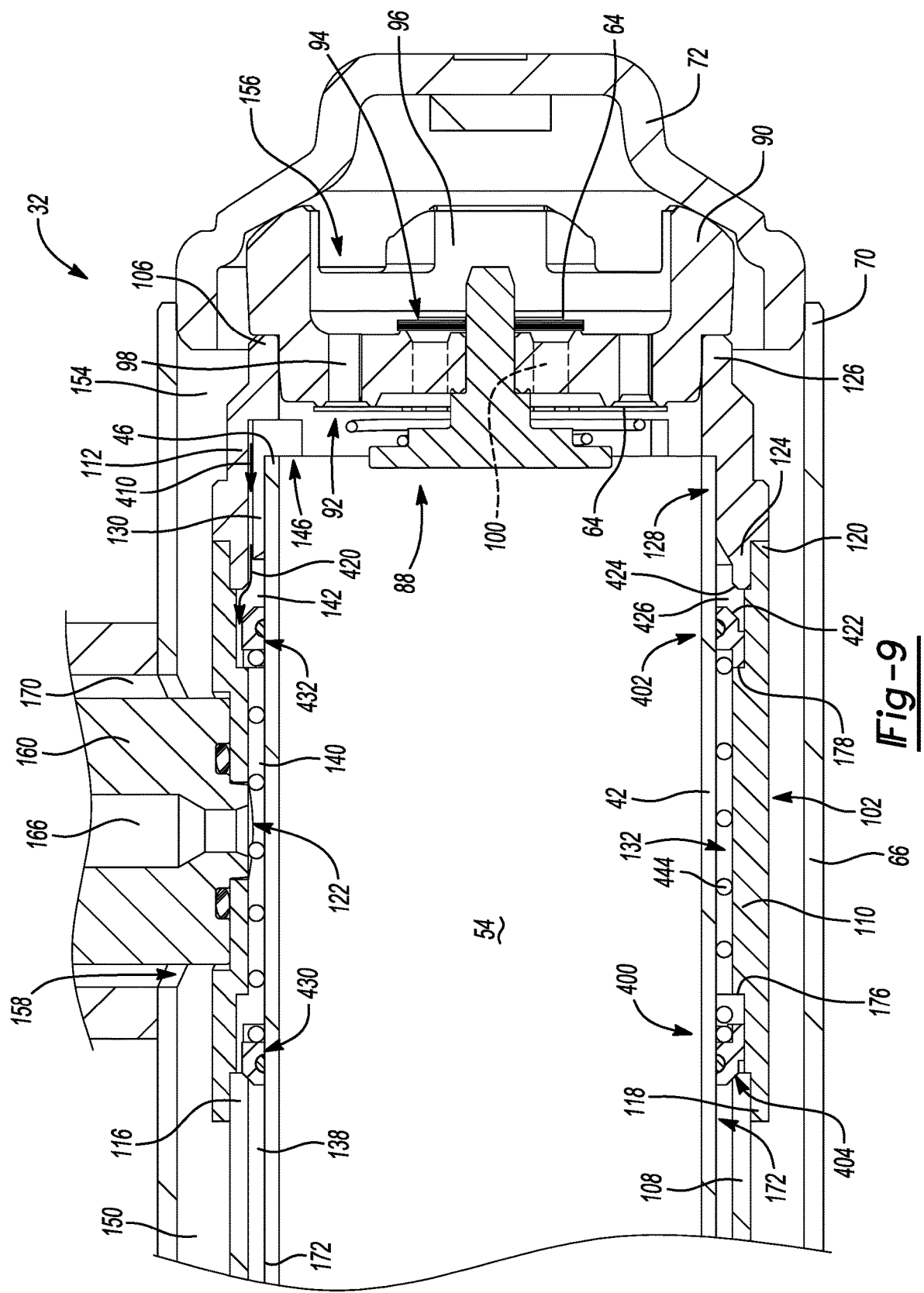
FIG. 9 is an enlarged side cross-sectional view of the exemplary damper shown in FIG. 7, where the first unidirectional blocking valve is illustrated in a closed position and the second unidirectional blocking valve is illustrated in an open position.

As shown in FIGS. 7 to 9, the damper 32 includes a spring oil sealing assembly 428 with a first sealing ring 430 that extends annularly about the inner tube 42 and a second sealing ring 432 that extends annularly about the inner tube 42. Each of the first and second sealing rings 430, 432 extends longitudinally between a first sealing ring end 434 and a second sealing ring end 436, and includes an outer sealing ring surface 438 that is formed with a plurality of grooves 440 that allow fluid to pass between the first and second sealing rings 430, 432 and the control valve coupling sleeve 110. The second sealing ring end 436 of the first sealing ring 430 is positioned to face the second sealing ring end 436 of the second sealing ring 432, which are arranged to contact the first and second shoulders 176, 178, which act as travel stops for the first and second sealing rings 430, 432.

The first sealing ring 430 is arranged in sliding contact with the inner tube 42 and the control valve coupling sleeve 110. The first sealing ring 430 is spring biased such that the first sealing ring end 434 is positioned in contact with the proximal end 116 of the third tube 108 in a seated position (FIG. 9) and is configured to slide longitudinally away from the proximal end 116 of the third tube 108 in an unseated position (FIG. 8) to open a first fluid flow path 412 through the first unidirectional blocking valve 400, which points in a first direction 408 moving from the first intermediate channel portion 138 to the second intermediate channel portion 140. As such, at least a portion of proximal end 116 of the third tube 108 acts as a first annular seat 416 against which a first annular sealing surface 414 of the first sealing ring 430 rests when the first sealing ring 430 is in the seated position, creating a first partition 404. As shown in FIG. 8, the first unidirectional blocking valve 400 opens when the first fluid pressure differential between the first intermediate channel portion 138 and the second intermediate channel portion 140 exceeds the first break pressure of the first unidirectional blocking valve 400, creating a first annular opening 418 between the first annular seat 416 and the first annular sealing surface 414, which allows fluid to pass through the first unidirectional blocking valve 400.

The second sealing ring 432 is arranged in sliding contact with the inner tube 42 and the control valve coupling sleeve 110. The second sealing ring 432 is spring biased such that the second sealing ring end 436 is positioned in contact with the first coupling end 124 of the base valve coupling sleeve 112 in a seated position (FIG. 8) and is configured to slide longitudinally away from the first coupling end 124 of the base valve coupling sleeve 112 in an unseated position (FIG. 9) to open a second fluid flow path 420 through the second unidirectional blocking valve 402, which points in a second direction 410 moving from the third intermediate channel portion 142 to the second intermediate channel portion 140. As such, at least a portion of the first coupling end 124 of the base valve coupling sleeve 112 acts as a second annular seat 424 against which a second annular sealing surface 422 of the second sealing ring 432 rests when the second sealing ring 432 is in the seated position, creating a second partition 406. As shown in FIG. 9, the second unidirectional block valve opens when the second fluid pressure differential between the third intermediate channel portion 142 and the second intermediate channel portion 140 exceeds the second break pressure of the second unidirectional blocking valve 402, creating a second annular opening 426 between the second annular seat 424 and the second annular sealing surface 422, which allows fluid to pass through the second unidirectional blocking valve 402.

The spring oil sealing assembly 428 includes a spring 444 that extends longitudinally between the first and second sealing rings 430, 432 and helically about the inner tube 42. The spring 444 is compressible between a first spring position and a second spring position, such that the spring 444 is compressed when one of the first and second sealing rings 430, 432 is pushed toward an unseated position by a pressure differential between the second intermediate channel portion 140 and the first or third intermediate channel portions 138, 142.

Figure 10:
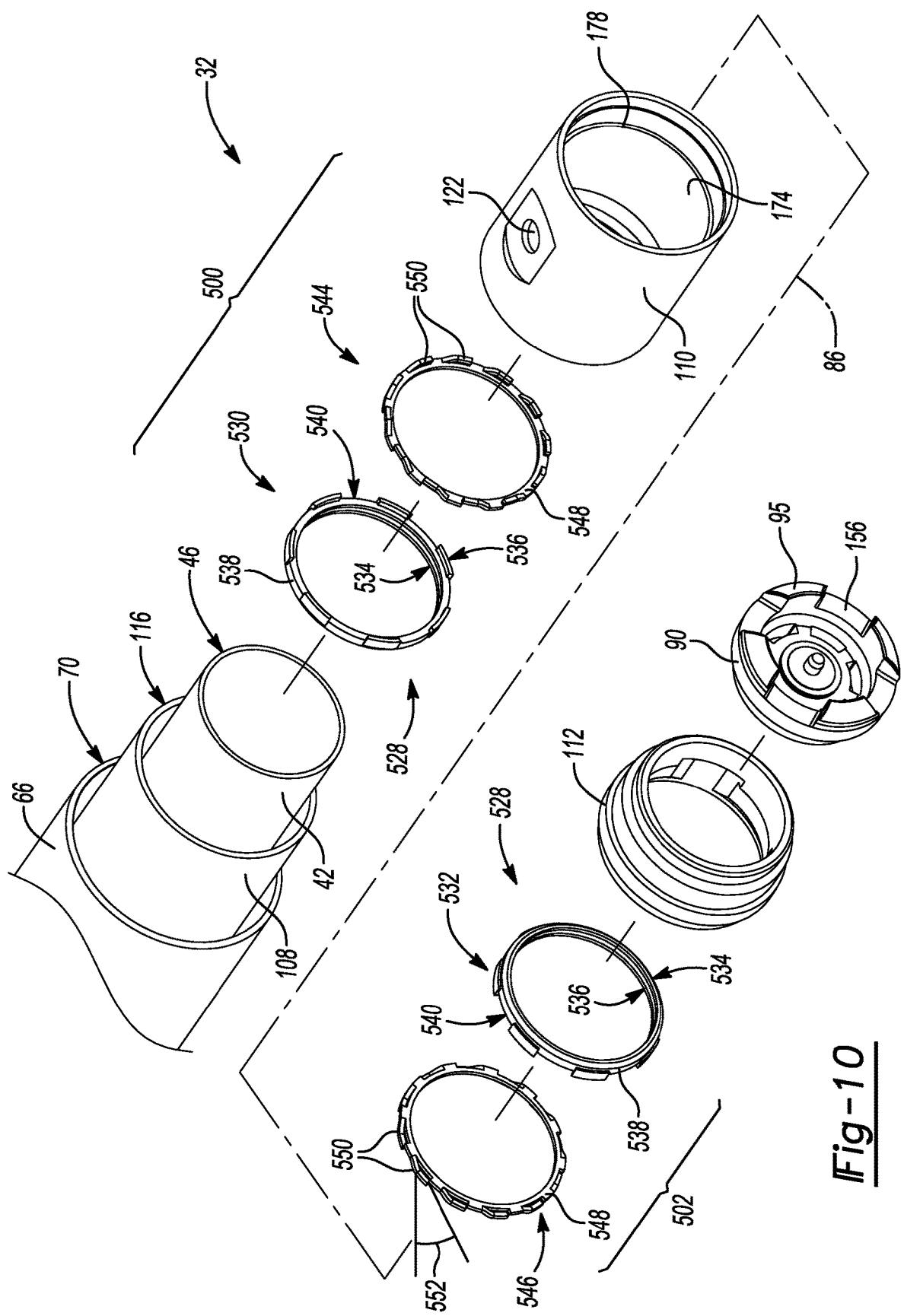
FIG. 10 is an enlarged exploded perspective view of another exemplary damper constructed in accordance with another aspect of the present disclosure.
Figure 11:
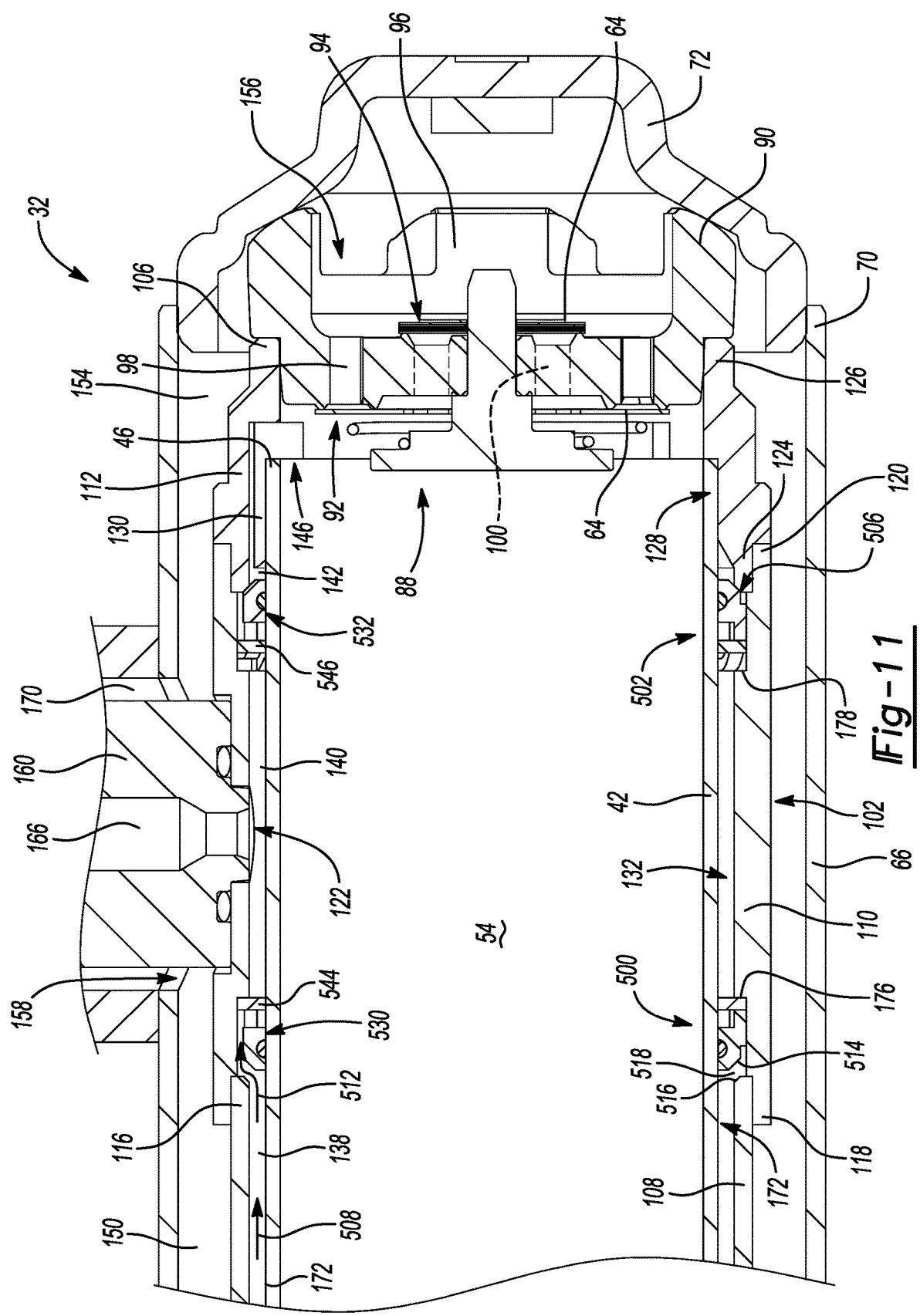
FIG. 11 is an enlarged side cross-sectional view of the exemplary damper shown in FIG. 10, where a first unidirectional blocking valve of the damper is illustrated in an open position and a second unidirectional blocking valve of the damper is illustrated in a closed position.
Figure 12:
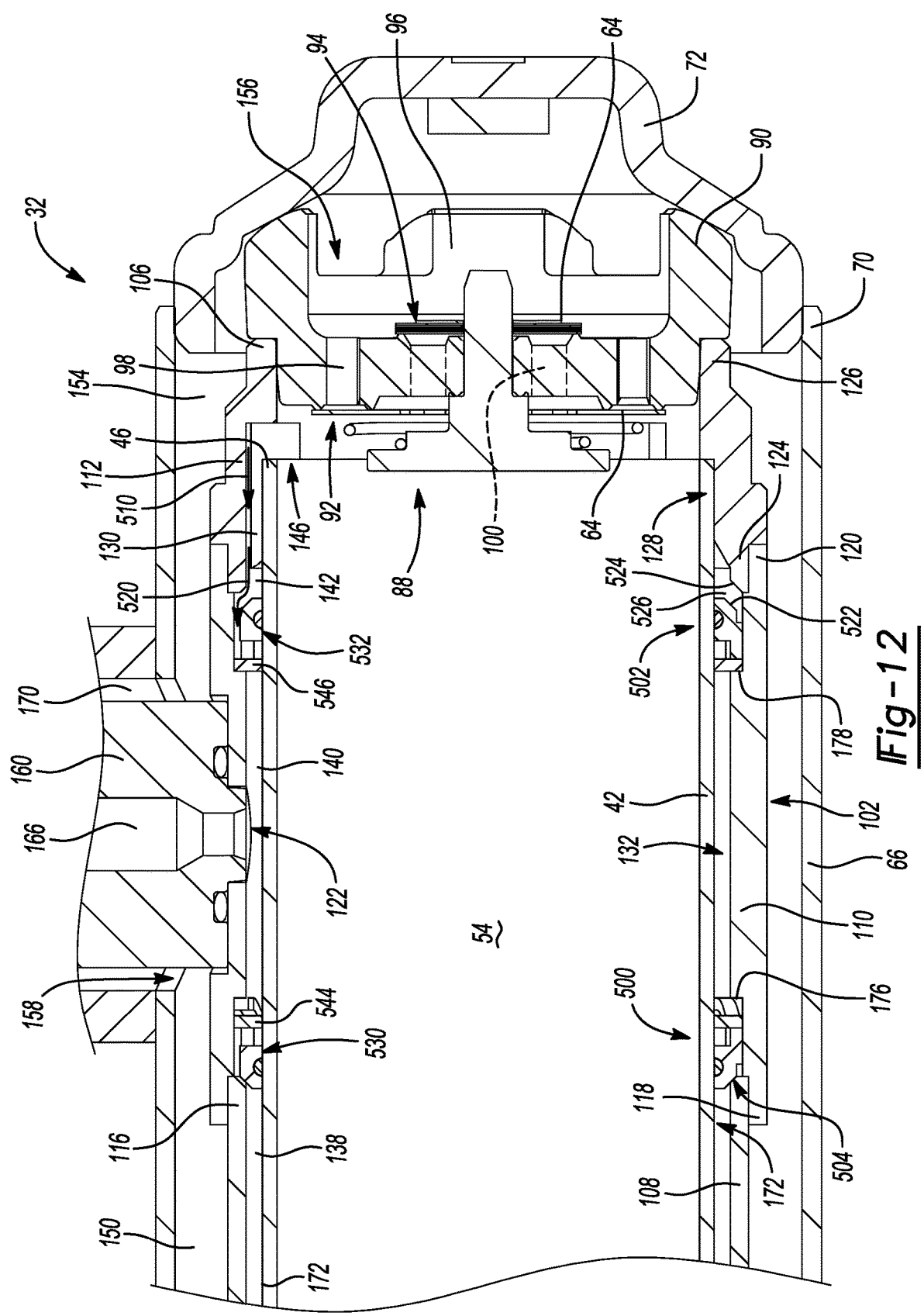
FIG. 12 is an enlarged side cross-sectional view of the exemplary damper shown in FIG. 10, where the first unidirectional blocking valve is illustrated in a closed position and the second unidirectional blocking valve is illustrated in an open position.

In another embodiment shown in FIGS. 10 to 12, the damper 32 includes an intake disc spring assembly 528 with a first sealing ring 530 that extends annularly about the inner tube 42 and a second sealing ring 532 that extends annularly about the inner tube 42. Each of the first and second sealing rings 530, 532 extends longitudinally between a first sealing ring end 534 and a second sealing ring end 536, and includes an outer sealing ring surface 538 that is formed with a plurality of grooves 540 that allow fluid to pass between the first and second sealing rings 530, 532 and the control valve coupling sleeve 110. The second sealing ring end 536 of the first sealing ring 530 is positioned to face the second sealing ring end 536 of the second sealing ring 532, which are arranged to contact the first and second shoulders 176, 178, which act as travel stops for the first and second sealing rings 530, 532.

The first sealing ring 530 is arranged in sliding contact with the inner tube 42 and the control valve coupling sleeve 110. The first sealing ring 530 is spring biased such that the first sealing ring end 534 is positioned in contact with the proximal end 116 of the third tube 108 in a seated position (FIG. 12) and is configured to slide longitudinally away from the proximal end 116 of the third tube 108 in an unseated position (FIG. 11) to open a first fluid flow path 512 through the first unidirectional blocking valve 500, which points in a first direction 508 moving from the first intermediate channel portion 138 to the second intermediate channel portion 140. As such, at least a portion of proximal end 116 of the third tube 108 acts as a first annular seat 516 against which a first annular sealing surface 514 of the first sealing ring 530 rests when the first sealing ring 530 is in the seated position, creating a first partition 504. As shown in FIG. 11, the first unidirectional blocking valve 500 opens when the first fluid pressure differential between the first intermediate channel portion 138 and the second intermediate channel portion 140 exceeds the first break pressure of the first unidirectional blocking valve 500, creating a first annular opening 518 between the first annular seat 516 and the first annular sealing surface 514, which allows fluid to pass through the first unidirectional blocking valve 500.

The second sealing ring 532 is arranged in sliding contact with the inner tube 42 and the control valve coupling sleeve 110. The second sealing ring 532 is spring biased such that the second sealing ring end 536 is positioned in contact with the first coupling end 124 of the base valve coupling sleeve 112 in a seated position (FIG. 11) and is configured to slide longitudinally away from the first coupling end 124 of the base valve coupling sleeve 112 in an unseated position (FIG. 12) to open a second fluid flow path 520 through the second unidirectional blocking valve 502, which points in a second direction 510 moving from the third intermediate channel portion 142 to the second intermediate channel portion 140. As such, at least a portion of the first coupling end 124 of the base valve coupling sleeve 112 acts as a second annular seat 524 against which a second annular sealing surface 522 of the second sealing ring 532 rests when the second sealing ring 532 is in the seated position, creating a second partition 506. As shown in FIG. 12, the second unidirectional block valve 502 opens when the second fluid pressure differential between the third intermediate channel portion 142 and the second intermediate channel portion 140 exceeds the second break pressure of the second unidirectional blocking valve 502, creating a second annular opening 526 between the second annular seat 524 and the second annular sealing surface 522, which allows fluid to pass through the second unidirectional blocking valve 502.

The intake disc spring assembly 528 includes a first intake disc spring 544 and a second intake disc spring 546. Each of the first intake disc spring 544 and second intake disc spring 546 have a flat ring 548 and a plurality of resilient fingers 550 that extend from the flat ring 548 at an angle 552. The first intake disc spring 544 is positioned longitudinally between the second sealing ring end 536 of the first sealing ring 530 and the first shoulder 176. The second intake disc spring 546 is positioned longitudinally between the second sealing ring end 536 of the second sealing ring 532 and the second shoulder 178. The plurality of resilient fingers 550 of the first and second intake disc springs 544, 546 abut the plurality of grooves 540 of the first and second sealing rings 530, 532. The plurality of resilient fingers 550 are compressible between an uncompressed position and a compressed position, such that the plurality of resilient fingers 550 are flattened in the compressed position when one of the first and second sealing rings 530, 532 is pushed toward an unseated position by a pressure differential between the second intermediate channel portion 140 and the first or third intermediate channel portions 138, 142.

Figure 13:
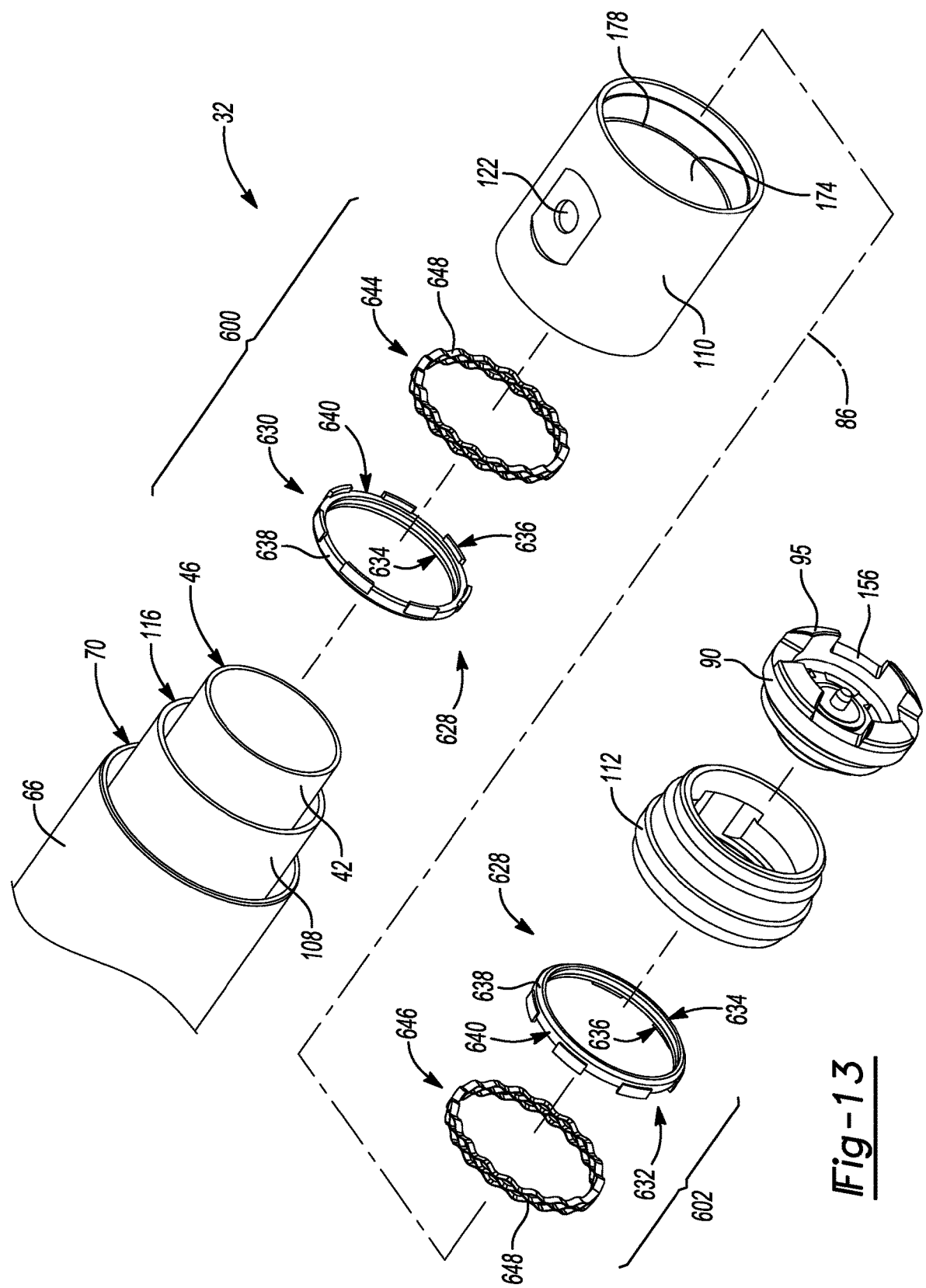
FIG. 13 is an enlarged exploded perspective view of another exemplary damper constructed in accordance with another aspect of the present disclosure.
Figure 14:
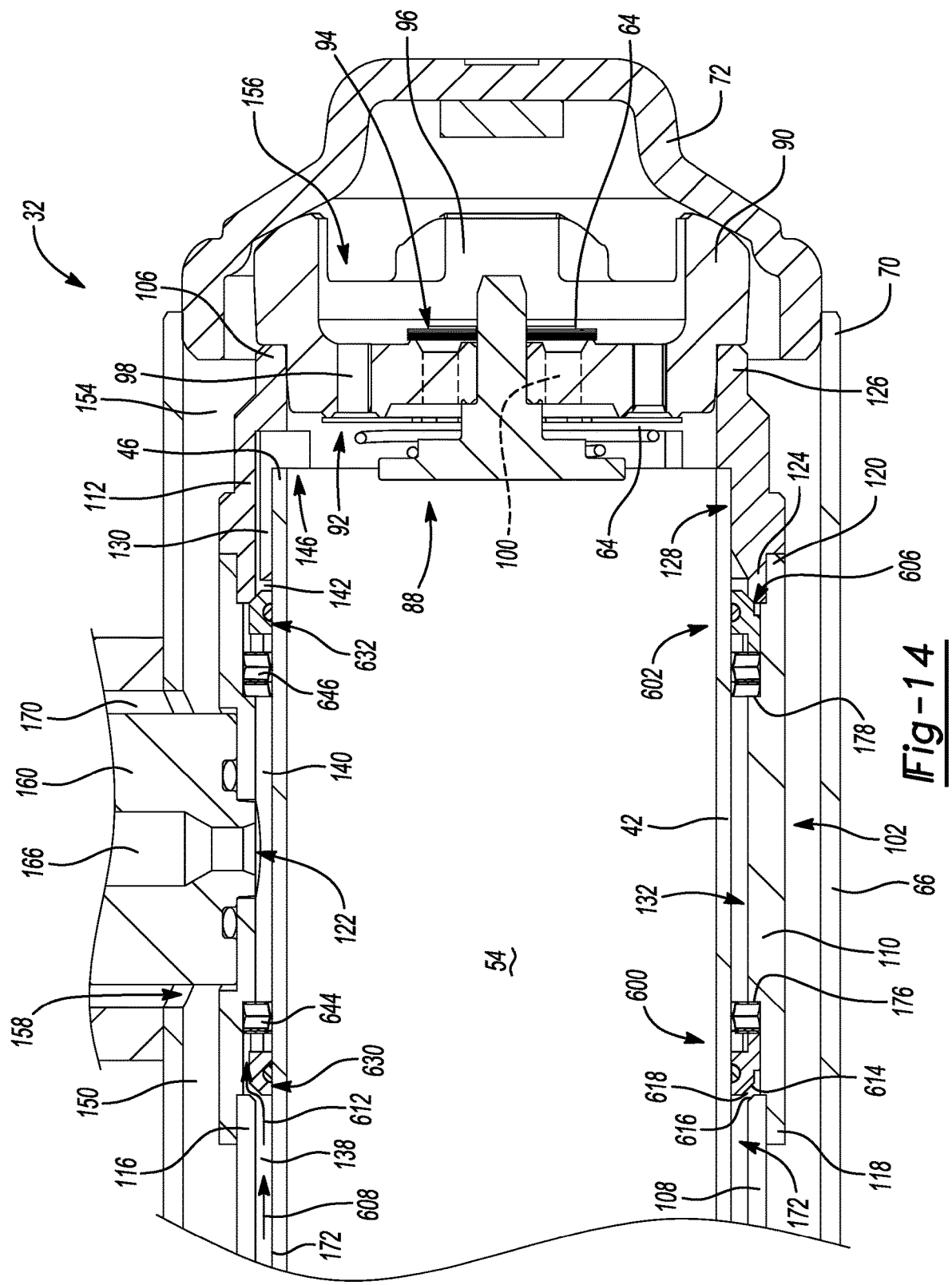
FIG. 14 is an enlarged side cross-sectional view of the exemplary damper shown in FIG. 13, where a first unidirectional blocking valve of the damper is illustrated in an open position and a second unidirectional blocking valve of the damper is illustrated in a closed position.
Figure 15:
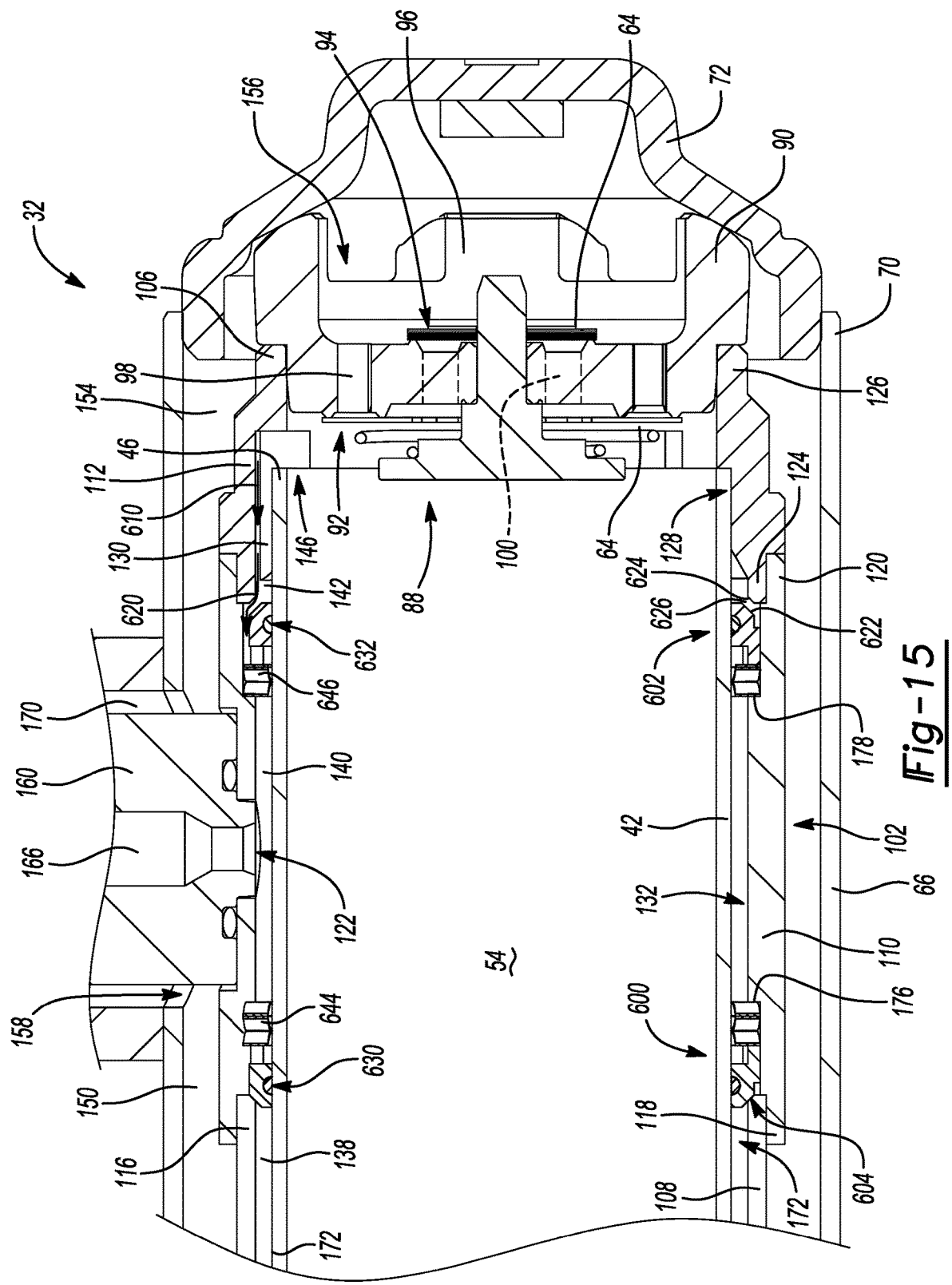
FIG. 15 is an enlarged side cross-sectional view of the exemplary damper shown in FIG. 13, where the first unidirectional blocking valve is illustrated in a closed position and the second unidirectional blocking valve is illustrated in an open position.

In another embodiment shown in FIGS. 13 to 15, the damper 32 includes a wave spring assembly 628 with a first sealing ring 630 that extends annularly about the inner tube 42 and a second sealing ring 632 that extends annularly about the inner tube 42. Each of the first and second sealing rings 630, 632 extends longitudinally between a first sealing ring end 634 and a second sealing ring end 636, and includes an outer sealing ring surface 638 that is formed with a plurality of grooves 640 that allow fluid to pass between the first and second sealing rings 630, 632 and the control valve coupling sleeve 110. The second sealing ring end 636 of the first sealing ring 630 is positioned to face the second sealing ring end 636 of the second sealing ring 632, which are arranged to contact the first and second shoulders 176, 178, which act as travel stops for the first and second sealing rings 630, 632.

The first sealing ring 630 is arranged in sliding contact with the inner tube 42 and the control valve coupling sleeve 110. The first sealing ring 630 is spring biased such that the first sealing ring end 634 is positioned in contact with the proximal end 116 of the third tube 108 in a seated position (FIG. 15) and is configured to slide longitudinally away from the proximal end 116 of the third tube 108 in an unseated position (FIG. 14) to open a first fluid flow path 612 through the first unidirectional blocking valve 600, which points in a first direction 608 moving from the first intermediate channel portion 138 to the second intermediate channel portion 140. As such, at least a portion of proximal end 116 of the third tube 108 acts as a first annular seat 616 against which a first annular sealing surface 614 of the first sealing ring 630 rests when the first sealing ring 630 is in the seated position, creating a first partition 604. As shown in FIG. 14, the first unidirectional blocking valve 600 opens when the first fluid pressure differential between the first intermediate channel portion 138 and the second intermediate channel portion 140 exceeds the first break pressure of the first unidirectional blocking valve 600, creating a first annular opening 618 between the first annular seat 616 and the first annular sealing surface 614, which allows fluid to pass through the first unidirectional blocking valve 600.

The second sealing ring 632 is arranged in sliding contact with the inner tube 42 and the control valve coupling sleeve 110. The second sealing ring 632 is spring biased such that the second sealing ring end 636 is positioned in contact with the first coupling end 124 of the base valve coupling sleeve 112 in a seated position (FIG. 14) and is configured to slide longitudinally away from the first coupling end 124 of the base valve coupling sleeve 112 in an unseated position (FIG. 15) to open a second fluid flow path 620 through the second unidirectional blocking valve 602, which points in a second direction 610 moving from the third intermediate channel portion 142 to the second intermediate channel portion 140. As such, at least a portion of the first coupling end 124 of the base valve coupling sleeve 112 acts as a second annular seat 624 against which a second annular sealing surface 622 of the second sealing ring 632 rests when the second sealing ring 632 is in the seated position, creating a second partition 606. As shown in FIG. 15, the second unidirectional block valve 602 opens when the second fluid pressure differential between the third intermediate channel portion 142 and the second intermediate channel portion 140 exceeds the second break pressure of the second unidirectional blocking valve 602, creating a second annular opening 626 between the second annular seat 624 and the second annular sealing surface 622, which allows fluid to pass through the second unidirectional blocking valve 602.

The wave spring assembly 628 includes a first wave spring 644 and a second wave spring 646. Each of the first wave spring 644 and the second wave spring 646 are formed by at least one coil 648. The first wave spring 644 is positioned longitudinally between the second sealing ring end 636 of the first sealing ring 630 and the first shoulder 176. The second wave spring 646 is positioned longitudinally between the second sealing ring end 636 of the second sealing ring 632 and the second shoulder 178. The first and second wave springs 644, 646 have an uncompressed position and a compressed position, such that the first wave spring 644 and the second wave spring 646 are flattened in the compressed position when one of the first and second sealing rings 630, 632 is pushed toward an unseated position by a pressure differential between the second intermediate channel portion 140 and the first or third intermediate channel portions 138, 142.

Figure 16:
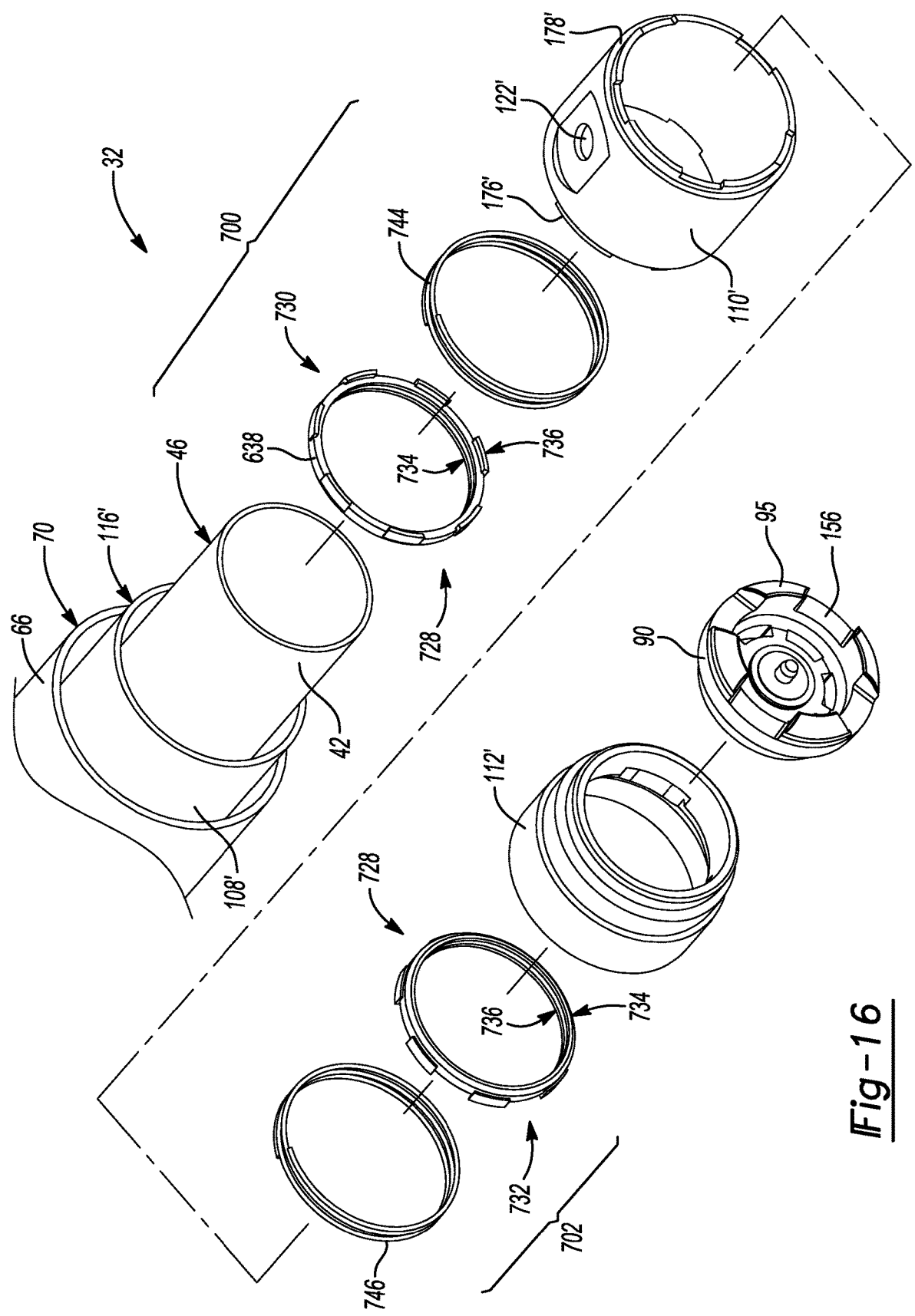
FIG. 16 is an enlarged exploded perspective view of another exemplary damper constructed in accordance with another aspect of the present disclosure.
Figure 17:
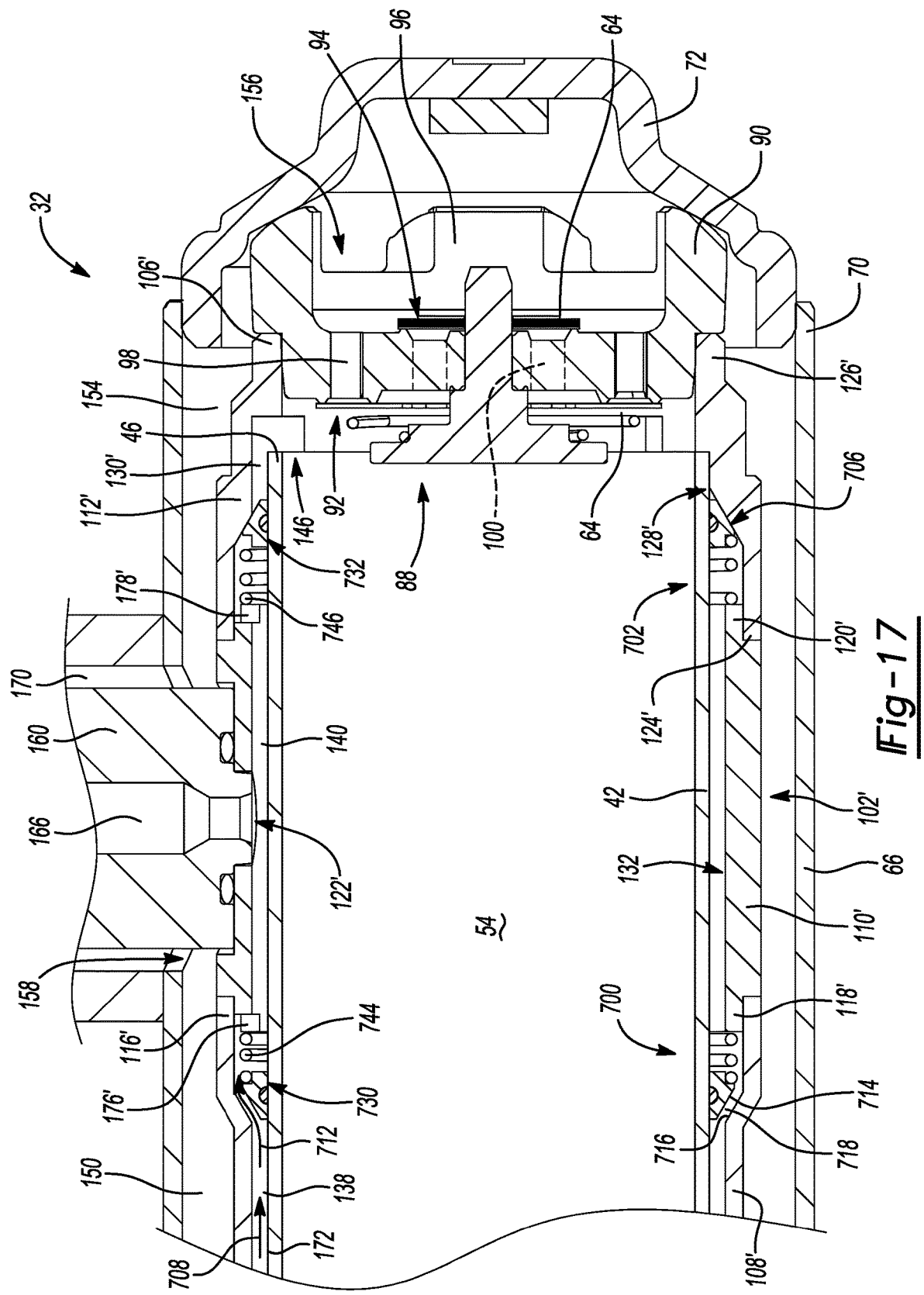
FIG. 17 is an enlarged side cross-sectional view of the exemplary damper shown in FIG. 16, where a first unidirectional blocking valve of the damper is illustrated in an open position and a second unidirectional blocking valve of the damper is illustrated in a closed position.
Figure 18:
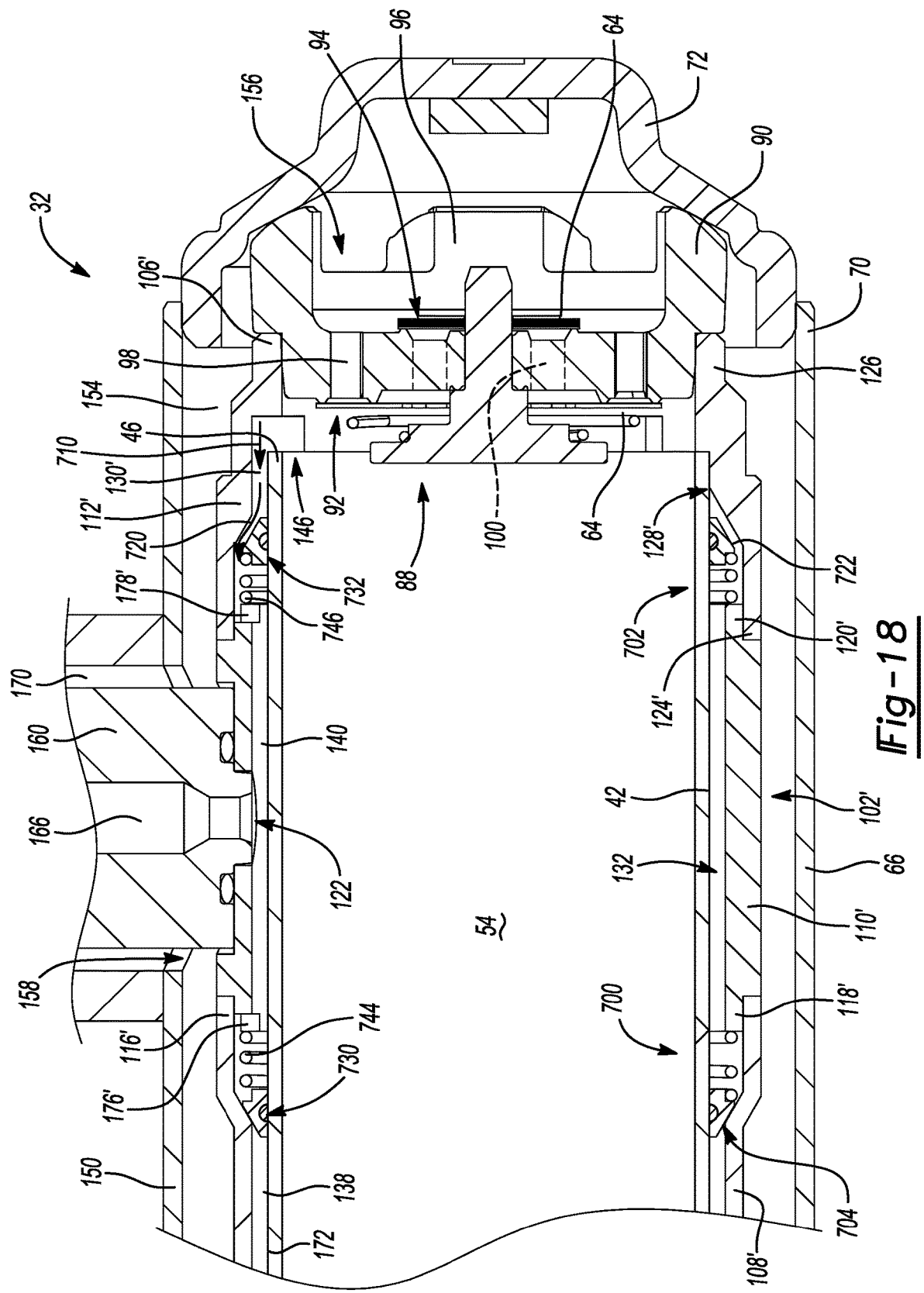
FIG. 18 is an enlarged side cross-sectional view of the exemplary damper shown in FIG. 16, where the first unidirectional blocking valve is illustrated in a closed position and the second unidirectional blocking valve is illustrated in an open position.

In another embodiment shown in FIGS. 16 to 18, the damper 32 includes an intake spring assembly 728. Certain components of this embodiment (FIGS. 16 to 18) share similar, but not the same, components with the previously described embodiments (FIGS. 3 to 15). Equivalent elements in FIGS. 16 to 18 are represented with a prime after the reference numerals. For example, elements of the intermediate member assembly 102 in FIGS. 2 to 15 correspond to elements of an intermediate member assembly 102' in FIGS. 16 to 18.

With reference to FIGS. 16 to 18, the intermediate member assembly 102' extends longitudinally between a first intermediate member assembly end 104' and a second intermediate member assembly end 106'. The intermediate member assembly 102' includes a third tube 108', a control valve coupling sleeve 110', and a base valve coupling sleeve 112'. The third tube 108' extends longitudinally between a distal end 114' and a proximal end 116'. Next, the control valve coupling sleeve 110' extends longitudinally between a first sleeve end 118' and a second sleeve end 120'. A first shoulder 176' is disposed adjacent to the first sleeve end 118' and a second shoulder 178' is disposed adjacent to the second sleeve end 120'. The control valve coupling sleeve 110' includes a control valve opening 122'. Finally, the base valve coupling sleeve 112' extends longitudinally between a first coupling end 124' and a second coupling end 126' that receives at least part of the base valve assembly 88. The base valve coupling sleeve 112' includes an interior sleeve surface 128' with a plurality of slots 130' that are circumferentially spaced.

The intake spring assembly 728 includes a first sealing ring 730 that extends annularly about the inner tube 42 and a second sealing ring 732 that extends annularly about the inner tube 42. Each of the first and second sealing rings 730, 732 extends longitudinally between a first sealing ring end 734 and a second sealing ring end 736. The second sealing ring end 736 of the first sealing ring 730 is positioned to face the second sealing ring end 736 of the second sealing ring 732, which are arranged to contact the first and second shoulders 176', 178', which act as travel stops for the first and second sealing rings 730, 732.

The first sealing ring 730 is arranged in sliding contact with the inner tube 42 and the control valve coupling sleeve 110'. The first sealing ring 730 is spring biased such that the first sealing ring end 734 is positioned in contact with the proximal end 116' of the third tube 108' in a seated position (FIG. 18) and is configured to slide longitudinally away from the proximal end 116' of the third tube 108' in an unseated position (FIG. 17) to open a first fluid flow path 712 through the first unidirectional blocking valve 700, which points in a first direction 708 moving from the first intermediate channel portion 138 to the second intermediate channel portion 140. As such, at least a portion of proximal end 116' of the third tube 108' acts as a first annular seat 716 against which a first annular sealing surface 714 of the first sealing ring 730 rests when the first sealing ring 730 is in the seated position, creating a first partition 704. As shown in FIG. 17, the first unidirectional blocking valve 700 opens when the first fluid pressure differential between the first intermediate channel portion 138 and the second intermediate channel portion 140 exceeds the first break pressure of the first unidirectional blocking valve 700, creating a first annular opening 718 between the first annular seat 716 and the first annular sealing surface 714, which allows fluid to pass through the first unidirectional blocking valve 700.

The second sealing ring 732 is arranged in sliding contact with the inner tube 42 and the control valve coupling sleeve 110'. The second sealing ring 732 is spring biased such that the second sealing ring end 736 is positioned in contact with the first coupling end 124' of the base valve coupling sleeve 112' in a seated position (FIG. 17) and is configured to slide longitudinally away from the first coupling end 124' of the base valve coupling sleeve 112' in an unseated position (FIG. 18) to open a second fluid flow path 720 through the second unidirectional blocking valve 702, which points in a second direction 710 moving from the third intermediate channel portion 142 to the second intermediate channel portion 140. As such, at least a portion of the first coupling end 124' of the base valve coupling sleeve 112' acts as a second annular seat 724 against which a second annular sealing surface 722 of the second sealing ring 732 rests when the second sealing ring 732 is in the seated position, creating a second partition 706. As shown in FIG. 18, the second unidirectional block valve 702 opens when the second fluid pressure differential between the third intermediate channel portion 142 and the second intermediate channel portion 140 exceeds the second break pressure of the second unidirectional blocking valve 702, creating a second annular opening 726 between the second annular seat 724 and the second annular sealing surface 722, which allows fluid to pass through the second unidirectional blocking valve 702.

The intake spring assembly 728 includes a first intake spring 744 and a second intake spring 746. The first intake spring 744 is positioned longitudinally between the second sealing ring end 736 of the first sealing ring 730 and the first shoulder 176'. The second intake spring 746 is positioned longitudinally between the second sealing ring end 736 of the second sealing ring 732 and the second shoulder 178'. The first intake spring 744 and the second intake spring 746 are compressible coil springs that extend helically about the inner tube 42. The first and second intake springs 744, 746 are compressible between an uncompressed position and a compressed position, such that the each of the first and second intake spring 744, 746 is compressed when one of the first and second sealing ring 730, 732 is pushed toward an unseated position by a pressure differential between the second intermediate channel portion 140 and the first or third intermediate channel portions 138, 142.

Operation of the damper 32 during a compression stroke and an extension (e.g. rebound) stroke will now be explained in greater detail.

Figure 19:
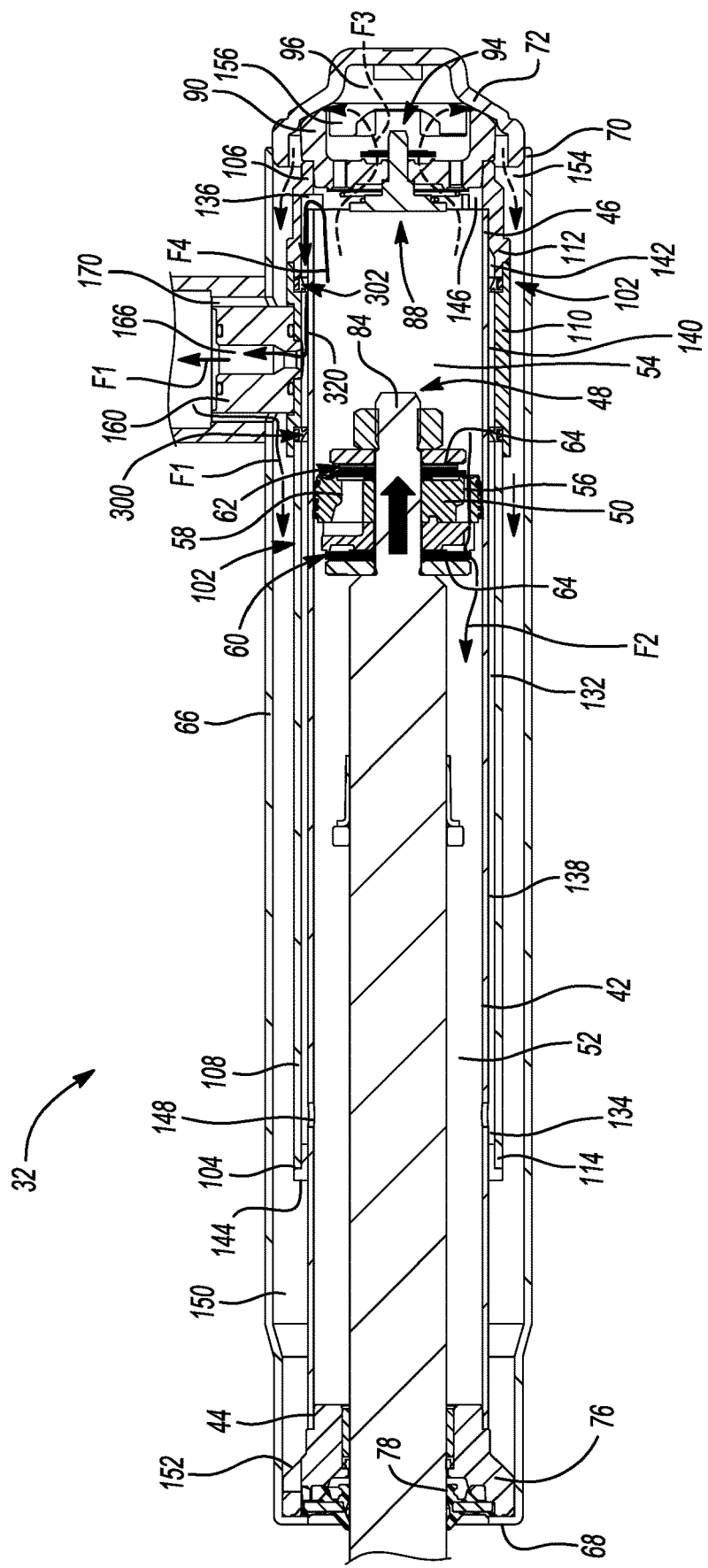
FIG. 19 is a side cross-sectional view of the exemplary damper shown in FIG. 3, where arrows are included illustrating the fluid flow path through the damper during a compression stroke.

With reference to FIG. 19, the damper 32 is shown in the compression stroke. A compression flow path F1 is defined when the external control valve 162 is opened. The piston 50 moves toward the second inner tube end 46 where fluid in the second working chamber 54 flows through the first piston valve 60 of the piston assembly 48 to the first working chamber 52 along flow path F2. Additionally, fluid in the second working chamber 54 flows through the second base valve 94 of the base valve assembly 88 and through the reservoir chamber passages 156 to the reservoir chamber 150 along flow path F3. Fluid in the second working chamber 54 also flows to the third intermediate channel portion 142 via the intermediate channel openings 146 and the plurality of slots 130 in the base valve coupling sleeve 112 along flow path F4. As the second unidirectional blocking valve 302 opens and the first unidirectional blocking valve 300 is closed due to fluid pressure, fluid in the third intermediate channel portion 142 flows into the second intermediate channel portion 140 via the second fluid flow path 320 through the second unidirectional blocking valve 302. Fluid in the second intermediate channel portion 140 flows to the control valve inlet 164 through the control valve inlet passage 166. Finally, fluid from the control valve inlet 164 flows to the control valve outlet 168 and into the reservoir chamber 150 via the control valve outlet passage 170 along the compression flow path F1.

Figure 20:
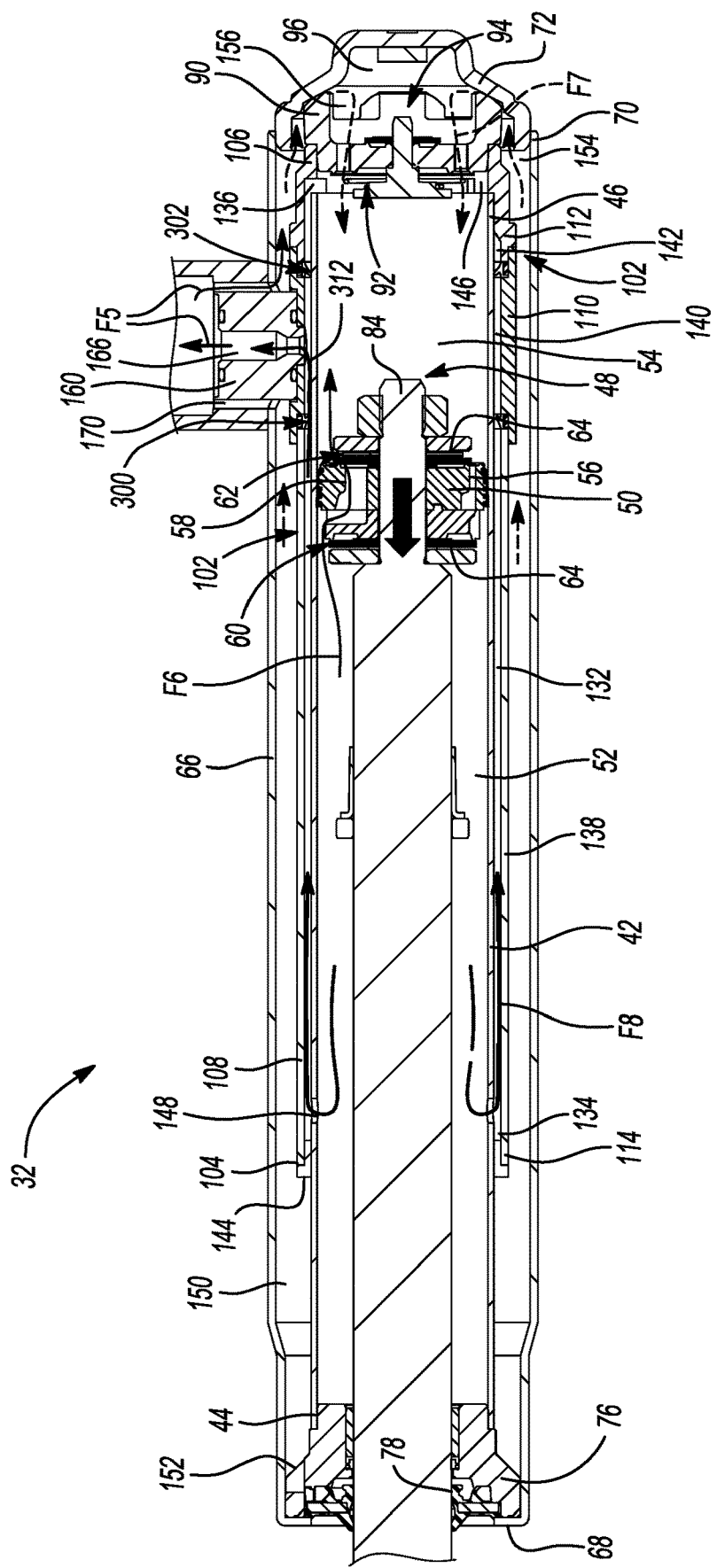
FIG. 20 is another side cross-sectional view of the exemplary damper shown in FIG. 3, where arrows are included illustrating the fluid flow path through the damper during an extension/rebound stroke.

With reference to FIG. 20, the damper 32 is shown in an extension/rebound stroke. An extension flow path F5 is defined when the external control valve 162 is opened. The piston 50 moves toward the first inner tube end 44 where fluid in the first working chamber 52 flows through the second piston valve 62 of the piston assembly 48 to the second working chamber 54 along flow path F6. Fluid in the reservoir chamber 150 flows through the reservoir chamber passages 156 and through the first base valve 92 of the base valve assembly 88 to the second working chamber 54 along flow path F7. Fluid in the first working chamber 52 flows to the first intermediate channel portion 138 via the inner tube opening 148 along flow path F8. As the first unidirectional blocking valve 300 opens and the second unidirectional blocking valve 302 is closed due to fluid pressure, fluid in the first intermediate channel portion 138 flows into the second intermediate channel portion 140 via the first fluid flow path 312 through the first unidirectional blocking valve 300. Fluid in the second intermediate channel portion 140 flows to the control valve inlet 164 via the control valve inlet passage 166. Finally, fluid from the control valve inlet 164 flows to the control valve outlet 168 and into the reservoir chamber 150 via the control valve outlet passage 170 along the extension flow path F5.

Figure 21:
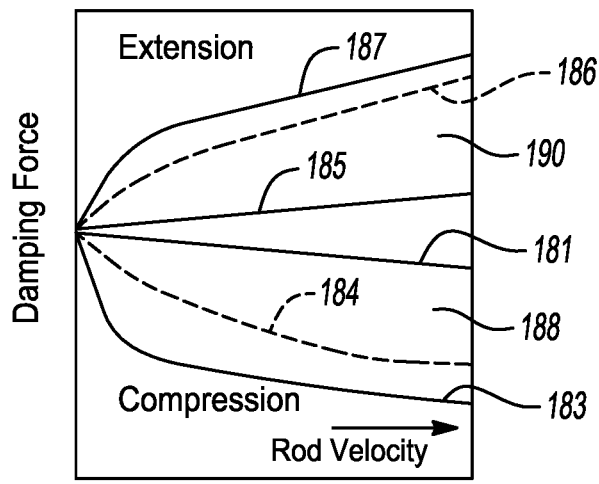
FIG. 21 is a plot illustrating damping force as a function of rod velocity during compression and extension/rebound strokes for the damper designs described herein.
Figure 22:
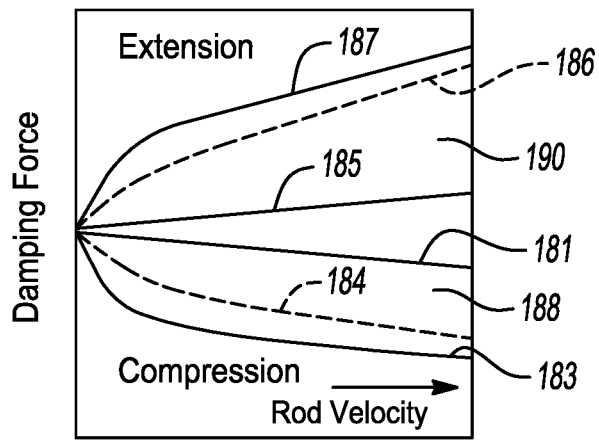
FIG. 22 is a plot illustrating damping force as a function of rod velocity during compression and extension/rebound strokes for existing damper designs having one control valve.
Figure 23:
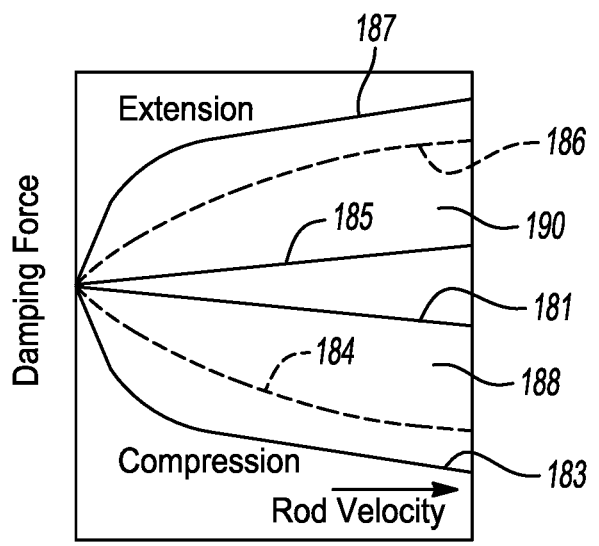
FIG. 23 is a plot illustrating damping force as a function of rod velocity during compression and extension/rebound strokes for existing damper designs having two control valves.

FIG. 21 illustrates a compression and extension damping curve 184, 186 in accordance with the present disclosure. For comparison, FIG. 22 illustrates the compression and extension damping curves 184, 186 for existing dampers having one external control valve and FIG. 23 illustrates the same for existing dampers having two external control valves. Each of the compression and extension damping curves 184, 186 represent damping force as a function of rod velocity during compression and extension/rebound strokes, respectively, for a particular damping level. As explained above, the degree and speed in which the external control valve 162 opens during compression and extension/rebound strokes can be controlled by the electronic controller 40 to control or change the damping force. Therefore, FIGS. 21 to 23 each illustrate a compression region 188 and an extension region 190 to represent a range of compression and extension damping forces that the damper can be tuned to provide, where damping curve 181 represents a lower limit of the compression region 188, damping curve 183 represents an upper limit of the compression region 188, damping curve 185 represents a lower limit of the extension region 190, and damping curve 187 represents an upper limit of the extension region 190.

FIG. 22 shows that for existing dampers with one external control valve, the range of damping forces available during the compression stroke are shown to be notably less than the range of damping forces available during the extension/rebound stroke. In contrast, FIG. 23 shows that the range of damping forces available during compression and extension/rebound stroke for existing dampers with two external control valves are comparable. Therefore, existing dampers with one external control valve allow for a smaller range of damping forces provided during the compression stroke when compared against existing dampers with two external control valves. Thus, existing dampers with one external control valve are limited in the range of damping forces provided during the compression stroke.

Comparing FIGS. 21 and 22 reveals that the upper limit 183 of the compression region 188 is greater in magnitude for the dampers 32 described herein (and shown in FIG. 21) compared to existing dampers with one external control valve (and shown in FIG. 22). Comparing FIGS. 21 and 23 reveals that the upper limit 183 of the compression region 188 has almost the same magnitude of the dampers 32 described herein (and shown in FIG. 21) compared to existing dampers with two external control valves (and shown in FIG. 23).

Therefore, the dampers 32 of the present disclosure allow for an increased range of damping force provided during the compression stroke compared to existing dampers with one external control valve. The range of damping force provided during the compression stroke of the dampers 32 of the present disclosure is shown to be similar to the results attained by existing dampers having two external control valves. In other words, the disclosed designs, which use just one external control valve 162, can provide similar damping force ranges as existing dampers with two external control valves. Thus, the dampers 32 of the present disclosure, which use just one external control valve 162, can be tuned for a greater range of vehicle application without the extra cost and complexity of a second external control valve.

While aspects of the present disclosure have been particularly shown and described with reference to the embodiments above, it will be understood by those skilled in the art that various additional embodiments may be contemplated by the modification of the disclosed dampers without departing from the spirit and scope of what is disclosed. Such embodiments should be understood to fall within the scope of the present disclosure as determined based upon the claims and any equivalents thereof.

What is claimed is:

1. A damper, comprising:
    an inner tube that extends longitudinally between a first inner tube end and a second inner tube end;
    a piston assembly including a piston slidably disposed within said inner tube defining a first working chamber and a second working chamber;
    an outer tube disposed annularly around said inner tube that extends longitudinally between a first outer tube end and a second outer tube end;
    an intermediate member assembly disposed annularly about said inner tube and positioned radially between said inner tube and said outer tube;
    a reservoir chamber disposed radially between said intermediate member assembly and said outer tube;
    an intermediate channel disposed radially between said intermediate member assembly and said inner tube;
    said intermediate channel has a first intermediate channel portion and a second intermediate channel portion;
    an external control valve including a control valve inlet positioned in fluid communication with said second intermediate channel portion and a control valve outlet positioned in fluid communication with said reservoir chamber;
    a first unidirectional blocking valve disposed annularly about said inner tube that forms a first partition between said first intermediate channel portion and said second intermediate channel portion;
    said first unidirectional blocking valve is a one-way valve that permits fluid flow in only a first direction moving from said first intermediate channel portion to said second intermediate channel portion when a first break pressure of said first unidirectional blocking valve is reached to place said first unidirectional blocking valve in an open position; and
    said first unidirectional blocking valve including a first annular sealing surface that extends circumferentially about said inner tube and that is configured to move into and out of contact with a first annular seat such that a first annular opening that extends annularly within said intermediate channel is defined between said first annular sealing surface and said first annular seat when said first unidirectional blocking valve is in said open position.

2. The damper as set forth in claim 1, wherein said first annular sealing surface contacts said first annular seat when a first fluid pressure differential between said first intermediate channel portion and said second intermediate channel portion is less than said first break pressure to define a closed position of said first unidirectional blocking valve.

3. The damper as set forth in claim 2, wherein said intermediate channel has a third intermediate channel portion that is arranged within said intermediate channel such that said second intermediate channel portion is positioned longitudinally between said first and third intermediate channel portions.

4. The damper as set forth in claim 3, further comprising:
    a second unidirectional blocking valve disposed annularly about said inner tube that forms a second partition between said second intermediate channel portion and said third intermediate channel portion;
    said second unidirectional blocking valve is a one-way valve that permits fluid flow in only a second direction moving from said third intermediate channel portion to said second intermediate channel portion when a second break pressure of said second unidirectional blocking valve is reached to place said second unidirectional blocking valve in said open position; and
    said second unidirectional blocking valve includes a second annular sealing surface that extends circumferentially about said inner tube and that is configured to move into and out of contact with a second annular seat such that a second annular opening that extends annularly within said intermediate channel is defined between said second annular sealing surface and said second annular seat when said second unidirectional blocking valve is in said open position.

5. The damper as set forth in claim 4, wherein said second annular sealing surface contacts said second annular seat when a second fluid pressure differential between said second intermediate channel portion and said third intermediate channel portion is less than said second break pressure to define a closed position of said second unidirectional blocking valve.

6. The damper as set forth in claim 5, wherein said intermediate member assembly has an interior surface and wherein said first and second annular seats of said first and second unidirectional blocking valves are portions of said interior surface of said intermediate member assembly and are contacted by said first and second annular sealing surfaces of said first and second unidirectional blocking valves when said first and second unidirectional blocking valves are in said closed position.

7. The damper as set forth in claim 6, wherein said first unidirectional blocking valve includes a first sealing ring and said second unidirectional blocking valve includes a second sealing ring and wherein each of said first and second sealing rings are disposed annularly about said inner tube and arranged in sliding contact with said inner tube and said intermediate member assembly.

8. The damper as set forth in claim 7, further comprising: a spring that extends longitudinally between said first and second sealing rings and helically about said inner tube, wherein said spring is compressible and biases said first and second annular sealing surfaces of said first and second sealing rings into contact with said first and second annular seats.

9. The damper as set forth in claim 7, wherein said first and second unidirectional blocking valves include first and second intake disc springs that are positioned longitudinally between first and second shoulders disposed on said interior surface of said intermediate member assembly and said first and second sealing rings, wherein each of the first and second intake disc springs has a flat ring and a plurality of resilient fingers that extend from said flat ring at an angle, and wherein said plurality of resilient fingers are compressible and bias said first and second annular sealing surfaces of said first and second sealing rings into contact with said first and second annular seats.

10. The damper as set forth in claim 7, wherein said first and second unidirectional blocking valves include first and second wave springs that are positioned longitudinally between first and second shoulders disposed on said interior surface of said intermediate member assembly and said first and second sealing rings, wherein each of said first and second wave spring is formed by at least one coil, and wherein said first and second wave springs are compressible and bias said first and second annular sealing surfaces of said first and second sealing rings into contact with said first and second annular seat.

11. The damper as set forth in claim 7, wherein said first and second unidirectional blocking valves include first and second intake springs, wherein said first and second intake springs are positioned longitudinally between first and second shoulders disposed on said interior surface of said intermediate member assembly and said first and second sealing rings, wherein said first and second intake springs are compressible coil springs that extend helically about said inner tube and bias said first and second annular sealing surfaces of said first and second sealing rings into contact with said first and second annular seat.

12. The damper as set forth in claim 5, wherein said inner tube has an outer surface and wherein said first and second annular seats of said first and second unidirectional blocking valves are portions of said outer surface of said inner tube that are contacted by said first and second annular sealing surfaces of said first and second unidirectional blocking valves when said first and second unidirectional blocking valves are in said closed position.

13. The damper as set forth in claim 12, wherein said first and second unidirectional blocking valve include first and second oil seals each having a cylindrical seal portion that is arranged in abutting contact with said intermediate member assembly and a funnel shaped portion that extends radially inward at an angle from said cylindrical seal portion to said first and second annular sealing surfaces, respectively, and wherein said funnel shaped portion of said first and second oil seals is flexible such that said first and second annular sealing surfaces of said funnel shaped portion are configured to move into and out of contact with said first and second annular seats on said outer surface of said inner tube.

14. The damper as set forth in claim 1, further comprising:
a base valve assembly positioned between said second inner tube end and said second outer tube end, said base valve assembly including a base valve body, a first base valve, and a second base valve;
a fluid transport chamber positioned between said second outer tube end and said base valve body; and
at least one reservoir chamber passage that is arranged in fluid communication with and extends between said reservoir chamber and said fluid transport chamber.

15. A damper, comprising:
an inner tube that extends longitudinally between a first inner tube end and a second inner tube end;
a piston assembly including a piston slidably disposed within said inner tube defining a first working chamber and a second working chamber;
an outer tube disposed annularly around said inner tube;
an intermediate member assembly disposed annularly about said inner tube and positioned radially between said inner tube and said outer tube;
a reservoir chamber disposed radially between said intermediate member assembly and said outer tube;
an intermediate channel disposed radially between said intermediate member assembly and said inner tube;
said intermediate channel has a first intermediate channel portion, a second intermediate channel portion, and a third intermediate channel portion;
an external control valve including a control valve inlet positioned in fluid communication with said second intermediate channel portion and a control valve outlet positioned in fluid communication with said reservoir chamber;
a first unidirectional blocking valve disposed annularly about said inner tube that forms a first partition between said first intermediate channel portion and said second intermediate channel portion and a second unidirectional blocking valve disposed annularly about said inner tube that forms a second partition between said second intermediate channel portion and said third intermediate channel portion;
said first and second unidirectional blocking valves are one-way valves that permit fluid flow in only one direction such that said first unidirectional blocking valve permits fluid flow in a first direction moving from said first intermediate channel portion to said second intermediate channel portion when a first break pressure of said first unidirectional blocking valve is reached to place said first unidirectional blocking valve in an open position and said second unidirectional blocking valve permits fluid flow in a second direction moving from said third intermediate channel portion to said second intermediate channel portion when a second break pressure of said second unidirectional blocking valve is reached to place said second unidirectional blocking valve in an open position; and
each of said first and second unidirectional blocking valves include an annular sealing surface that extends circumferentially about said inner tube and that is configured to move into and out of contact with an annular seat such that an annular opening that extends annularly within said intermediate channel is defined between said annular sealing surface and said annular seat when each of said first and second unidirectional blocking valve is in said open position.

16. The damper as set forth in claim 15, further comprising:
- a base valve assembly positioned between said second inner tube end and said second outer tube end, said base valve assembly including a base valve body, a first base valve, and a second base valve;
- said base valve body having projections that abut said second outer tube end and define a fluid transport chamber positioned between said second outer tube end and said base valve body; and
- at least one reservoir chamber passage positioned between said projections on said base valve body that provides fluid communication between said reservoir chamber and said fluid transport chamber.

17. The damper as set forth in claim 16, wherein said intermediate member assembly extends longitudinally between a first intermediate member assembly end and a second intermediate member assembly end and includes a third tube, a control valve coupling sleeve, and a base valve coupling sleeve, wherein said third tube extends longitudinally between a distal end located at said first intermediate member assembly end and a proximal end that is positioned adjacent to said first unidirectional blocking valve, wherein said control valve coupling sleeve extends longitudinally between a first sleeve end that is positioned adjacent to said first unidirectional blocking valve and a second sleeve end that is positioned adjacent to said second unidirectional blocking valve, and wherein said base valve coupling sleeve extends longitudinally between a first coupling end that is positioned adjacent to said second unidirectional blocking valve and a second coupling end that receives at least part of said base valve assembly at said second intermediate assembly end.

18. A damper, comprising:
- an inner tube that extends longitudinally between a first inner tube end and a second inner tube end;
- a piston assembly including a piston slidably disposed within said inner tube defining a first working chamber and a second working chamber, a first piston valve, and a second piston valve;
- an outer tube disposed annularly around said inner tube;
- an intermediate member assembly disposed annularly about said inner tube and positioned radially between said inner tube and said outer tube;
- a reservoir chamber disposed radially between said intermediate member assembly and said outer tube;
- an intermediate channel disposed radially between said intermediate member assembly and said inner tube, extending longitudinally between a first intermediate channel end and a second intermediate channel end;
- said intermediate channel has a first intermediate channel portion, a second intermediate channel portion, and a third intermediate channel portion;
- said first intermediate channel portion is arranged in fluid communication with said first working chamber via at least one inner tube opening that extends through said inner tube between said first working chamber and said first intermediate channel portion;
- said third intermediate channel portion is arranged in fluid communication with said second working chamber via at least one intermediate channel opening positioned at said second intermediate channel end;
- an external control valve including a control valve inlet positioned in fluid communication with said second intermediate channel portion and a control valve outlet positioned in fluid communication with said reservoir chamber;
- a base valve assembly including a base valve body, a first base valve, and a second base valve, said base valve body defining a fluid transport chamber positioned between said second outer tube end and said base valve body;
- at least one reservoir chamber passage positioned in fluid communication with and extending between said reservoir chamber and said fluid transport chamber;
- a first unidirectional blocking valve disposed annularly about said inner tube that forms a first partition between said first intermediate channel portion and said second intermediate channel portion and a second unidirectional blocking valve disposed annularly about said inner tube that forms a second partition between said second intermediate channel portion and said third intermediate channel portion;
- said first and second unidirectional blocking valves are one-way valves that permit fluid flow in only one direction such that said first unidirectional blocking valve permits fluid flow in a first direction moving from said first intermediate channel portion to said second intermediate channel portion when a first break pressure of said first unidirectional blocking valve is reached and said second unidirectional blocking valve permits fluid flow in a second direction moving from said third intermediate channel portion to said second intermediate channel portion when a second break pressure of said second unidirectional blocking valve is reached; and
- each of said first and second unidirectional blocking valves including an annular sealing surface that extends circumferentially about said inner tube and that is configured to move into and out of contact with an annular seat that also extends circumferentially about said inner tube such that an annular opening that extends annularly within said intermediate channel is defined between said annular sealing surface and said annular seat when said first and second unidirectional blocking valves are open.

19. The damper as set forth in claim 18, wherein a compression flow path is defined when said external control valve is opened and said piston moves toward said second inner tube end where fluid in said second working chamber flows through said first piston valve of said piston assembly to said first working chamber, fluid in said second working chamber flows through said second base valve of said base valve assembly to said reservoir chamber, and fluid in said second working chamber flows to said third intermediate channel portion via said at least one intermediate channel opening, where fluid in said third intermediate channel portion flows into said second intermediate channel portion in said second direction as said second unidirectional blocking valve is open and said first unidirectional blocking valve is closed, and wherein fluid in said second intermediate channel portion flows to said external control valve through said control valve inlet and from said external control valve to said reservoir chamber through said control valve outlet.

20. The damper as set forth in claim 18, wherein said an extension flow path is defined when said external control valve is opened and said piston moves toward said first inner tube end where fluid in said first working chamber flows through said second piston valve of said piston assembly to said second working chamber, fluid in said reservoir chamber flows through said first base valve of said base valve assembly to said second working chamber, and fluid in said first working chamber flows to said first intermediate channel portion via said inner tube opening, where fluid in said first intermediate channel portion flows into said second intermediate channel portion in said first direction as said first unidirectional blocking valve is open and said second unidirectional blocking valve is closed, and wherein fluid in said second intermediate channel portion flows to said external control valve through said control valve inlet and from said external control valve to said reservoir chamber via said control valve outlet.

\* \* \* \* \*